US008782089B2

(12) United States Patent
Shapiro

(10) Patent No.: US 8,782,089 B2
(45) Date of Patent: Jul. 15, 2014

(54) SELECTIVE FILE ERASURE USING METADATA MODIFICATIONS AND APPARATUS

(71) Applicant: Alan Joshua Shapiro, Chappaqua, NY (US)

(72) Inventor: Alan Joshua Shapiro, Chappaqua, NY (US)

(*) Notice: Subject to any disclaimer, the term of this patent is extended or adjusted under 35 U.S.C. 154(b) by 0 days.

(21) Appl. No.: 13/973,453

(22) Filed: Aug. 22, 2013

(65) Prior Publication Data

US 2013/0339408 A1    Dec. 19, 2013

Related U.S. Application Data

(62) Division of application No. 13/325,820, filed on Dec. 14, 2011, now Pat. No. 8,521,781, which is a division of application No. 12/973,898, filed on Dec. 20, 2010, now Pat. No. 8,099,437, which is a division of application No. 12/534,839, filed on Aug. 3, 2009, now Pat. No. 7,856,451, which is a division of application No. 11/611,886, filed on Dec. 17, 2006, now Pat. No. 7,571,176.

(60) Provisional application No. 60/753,635, filed on Dec. 22, 2005, provisional application No. 60/747,201, filed on May 14, 2006.

(51) Int. Cl.
*G06F 17/30* (2006.01)

(52) U.S. Cl.
CPC .................................. *G06F 17/30* (2013.01)
USPC ............ 707/791; 707/802; 707/822; 707/828

(58) Field of Classification Search
CPC ........................................................ G06F 17/30
USPC ................................................ 707/600–899
See application file for complete search history.

(56) References Cited

U.S. PATENT DOCUMENTS

| 4,481,606 | A | 11/1984 | Nozawa et al. |
|---|---|---|---|
| 5,196,970 | A | 3/1993 | Seko et al. |
| 5,515,524 | A | 5/1996 | Lynch et al. |
| 5,708,798 | A | 1/1998 | Lynch et al. |
| 5,768,566 | A | 6/1998 | Harikrishnan et al. |
| 5,794,052 | A | 8/1998 | Harding |

(Continued)

FOREIGN PATENT DOCUMENTS

| CN | 200680053273 | 4/2011 |
|---|---|---|
| EP | 1688 922 A2 | 8/2006 |
| JP | 2003-323371 | 11/2003 |
| WO | WO2007072309 | 6/2007 |

OTHER PUBLICATIONS

Related U.S. Appl. No. 11/428,352 Appeal Brief, Nov. 16, 2007.

(Continued)

*Primary Examiner* — Isaac M Woo
(74) *Attorney, Agent, or Firm* — Charles A. Lemaire; Jonathan M. Rixen; Lemaire Patent Law Firm, P.L.L.C.

(57) ABSTRACT

A process that ensures the virtual destruction of data files a user wishes to erase from a storage medium, such as a hard drive, flash drive, or removable disk. This approach is appropriate for managing custom distributions from a large file sets as it is roughly linear in compute complexity to the number of files erased but is capped when many files are batch erased.

20 Claims, 16 Drawing Sheets

Data layout and free space for files A, B, C, and D. Note that the first blocks of each file are contiguous on the disk, making it faster to erase the first blocks. This approach makes it more difficult to recover usable copies of the files. Files B and C are spread across the media, making it more difficult to locate all of the blocks after deleting the metadata in the inode, directory entry, or FAT.

(56) References Cited

U.S. PATENT DOCUMENTS

| | | |
|---|---|---|
| 5,825,651 A | 10/1998 | Gupta et al. |
| 5,835,777 A | 11/1998 | Staelin |
| 5,842,024 A | 11/1998 | Choye et al. |
| 5,991,543 A | 11/1999 | Amberg et al. |
| 5,995,757 A | 11/1999 | Amberg et al. |
| 6,006,035 A | 12/1999 | Nabahai |
| 6,026,439 A | 2/2000 | Chowdhury et al. |
| 6,080,207 A | 6/2000 | Kroening et al. |
| 6,088,694 A * | 7/2000 | Burns et al. ............ 1/1 |
| 6,117,187 A | 9/2000 | Staelin |
| 6,131,192 A | 10/2000 | Henry |
| 6,182,275 B1 | 1/2001 | Beelitz et al. |
| 6,209,094 B1 | 3/2001 | Levine et al. |
| 6,247,024 B1 | 6/2001 | Kincaid |
| 6,247,126 B1 | 6/2001 | Beelitz et al. |
| 6,247,128 B1 | 6/2001 | Fisher et al. |
| 6,327,706 B1 | 12/2001 | Amberg et al. |
| 6,347,371 B1 | 2/2002 | Beelitz et al. |
| 6,367,075 B1 | 4/2002 | Kruger et al. |
| 6,385,766 B1 | 5/2002 | Doran, Jr. et al. |
| 6,405,362 B1 | 6/2002 | Shih et al. |
| 6,418,554 B1 | 7/2002 | Delo et al. |
| 6,442,754 B1 | 8/2002 | Curtis |
| 6,477,703 B1 | 11/2002 | Smith et al. |
| 6,490,723 B1 | 12/2002 | Bearden et al. |
| 6,496,875 B2 | 12/2002 | Cheng et al. |
| 6,501,491 B1 | 12/2002 | Brown et al. |
| 6,512,526 B1 | 1/2003 | McGlothlin et al. |
| 6,523,166 B1 | 2/2003 | Mishra et al. |
| 6,543,047 B1 | 4/2003 | Vrhel, Jr. et al. |
| 6,550,061 B1 | 4/2003 | Bearden et al. |
| 6,550,062 B2 | 4/2003 | Barajas et al. |
| 6,564,369 B1 | 5/2003 | Hove et al. |
| 6,598,223 B1 | 7/2003 | Vrhel, Jr. et al. |
| 6,604,238 B1 | 8/2003 | lim et al. |
| 6,615,405 B1 | 9/2003 | Goldman et al. |
| 6,615,406 B1 | 9/2003 | Amberg et al. |
| 6,668,289 B2 | 12/2003 | Cheng et al. |
| 6,681,266 B2 | 1/2004 | Ayyagari |
| 6,681,391 B1 | 1/2004 | Marino et al. |
| 6,687,902 B1 | 2/2004 | Curtis et al. |
| 6,691,253 B1 | 2/2004 | Gillenwater et al. |
| 6,711,798 B2 | 3/2004 | Sanders et al. |
| 6,718,373 B1 | 4/2004 | Bearden et al. |
| 6,721,946 B1 | 4/2004 | Fogarty et al. |
| 6,745,239 B1 | 6/2004 | Hubbard |
| 6,751,795 B1 | 6/2004 | Nakamura |
| 6,757,783 B2 | 6/2004 | Koh |
| 6,760,708 B1 | 7/2004 | Hubbard et al. |
| 6,760,721 B1 | 7/2004 | Chasen et al. |
| 6,765,595 B2 | 7/2004 | Lee et al. |
| 6,772,192 B1 | 8/2004 | Fulton et al. |
| 6,807,665 B2 | 10/2004 | Evans et al. |
| 6,823,376 B1 | 11/2004 | George et al. |
| 6,868,496 B2 | 3/2005 | Sales et al. |
| 6,874,092 B1 | 3/2005 | Motoyama et al. |
| 6,874,143 B1 | 3/2005 | Murray et al. |
| 6,907,604 B1 | 6/2005 | Macnair, Jr. et al. |
| 6,915,307 B1 | 7/2005 | Mattis et al. |
| 6,925,535 B2 | 8/2005 | Ziegler |
| 6,938,250 B2 | 8/2005 | Cohen et al. |
| 6,944,867 B2 | 9/2005 | Cheston et al. |
| 6,947,954 B2 | 9/2005 | Cohen et al. |
| 6,948,166 B2 | 9/2005 | Barfield et al. |
| 6,961,773 B2 | 11/2005 | Hartman et al. |
| 6,988,267 B2 | 1/2006 | Harris et al. |
| 6,990,636 B2 | 1/2006 | Beauchamp et al. |
| 6,993,642 B2 | 1/2006 | Burkhardt et al. |
| 7,017,144 B2 | 3/2006 | Cohen et al. |
| 7,062,645 B2 | 6/2006 | Kroening |
| 7,092,949 B2 | 8/2006 | Ohgake |
| 7,143,067 B1 | 11/2006 | Cheston et al. |
| 7,143,408 B2 | 11/2006 | Anderson et al. |
| 7,185,335 B2 | 2/2007 | Hind et al. |
| 7,228,326 B2 | 6/2007 | Srinivasan et al. |
| 7,228,542 B2 | 6/2007 | Bryant et al. |
| 7,295,994 B2 | 11/2007 | Yoshida et al. |
| 7,320,128 B2 | 1/2008 | Hirai |
| 7,330,967 B1 | 2/2008 | Pujare et al. |
| 7,363,420 B2 | 4/2008 | Lin et al. |
| 7,376,946 B2 | 5/2008 | Nakada et al. |
| 7,464,176 B2 | 12/2008 | Cohen et al. |
| 7,509,342 B2 | 3/2009 | Kanai |
| 7,665,084 B2 | 2/2010 | Suzuki et al. |
| 7,703,090 B2 | 4/2010 | Napier et al. |
| 7,849,253 B2 | 12/2010 | Stewart |
| 7,953,669 B2 | 5/2011 | Ohbitsu |
| 7,966,495 B2 | 6/2011 | Ackerman et al. |
| 8,074,214 B2 | 12/2011 | Isaacson et al. |
| 8,201,211 B2 | 6/2012 | Proust et al. |
| 2002/0083430 A1 | 6/2002 | Kusuda et al. |
| 2002/0087965 A1 | 7/2002 | Lin |
| 2002/0092014 A1 | 7/2002 | Shibusawa et al. |
| 2002/0129351 A1 | 9/2002 | Bedos et al. |
| 2002/0147972 A1 | 10/2002 | Olmeda et al. |
| 2002/0188941 A1 | 12/2002 | Cicciarelli et al. |
| 2003/0037326 A1 | 2/2003 | Burkhardt et al. |
| 2003/0046372 A1 | 3/2003 | Traxler |
| 2003/0046678 A1 | 3/2003 | Boxall et al. |
| 2003/0056207 A1 | 3/2003 | Fischer et al. |
| 2003/0135851 A1 | 7/2003 | Dickey et al. |
| 2003/0158926 A1 | 8/2003 | Kroening |
| 2003/0163807 A1 | 8/2003 | Drake et al. |
| 2003/0188305 A1 | 10/2003 | Morimoto |
| 2003/0217359 A1 | 11/2003 | Ohi et al. |
| 2004/0025155 A1 | 2/2004 | Sedlack et al. |
| 2004/0088697 A1 | 5/2004 | Schwartz et al. |
| 2004/0139430 A1 | 7/2004 | Eatough et al. |
| 2005/0055688 A1 | 3/2005 | Barajas et al. |
| 2005/0125524 A1 | 6/2005 | Chandrasekhar et al. |
| 2005/0193389 A1 | 9/2005 | Murphy et al. |
| 2005/0289513 A1 | 12/2005 | Chen et al. |
| 2006/0048139 A1 | 3/2006 | Nakamura |
| 2006/0053419 A1 | 3/2006 | Barfield et al. |
| 2006/0069754 A1 | 3/2006 | Buck et al. |
| 2006/0200656 A1 | 9/2006 | Cardinell et al. |
| 2006/0224402 A1 | 10/2006 | Hanna |
| 2006/0277183 A1 | 12/2006 | Nichols et al. |
| 2007/0005874 A1 | 1/2007 | Dodge |
| 2007/0028231 A1 | 2/2007 | Kelso et al. |

OTHER PUBLICATIONS

Related U.S. Appl. No. 11/428,352 Examiner's Answer to Appeal Brief, Feb. 7, 2008.
Related U.S. Appl. No. 11/428,352 Reply Brief, Apr. 7, 2008.
Related U.S. Appl. No. 11/428,369 Appeal Brief, Feb. 20, 2009.
Related U.S. Appl. No. 11/428,369 Examiner's Answer to Appeal Brief, May 28, 2009.
Related U.S. Appl. No. 11/428,369 Reply Brief, Jul. 20, 2009.
Related U.S. Appl. No. 11/428,374 Appeal Brief, Feb. 2, 2009.
Related U.S. Appl. No. 11/428,374 Examiner's Answer to Appeal Brief, May 12, 2009.
Related U.S. Appl. No. 11/428,374 Reply Brief, Jul. 13, 2009.
Related U.S. Appl. No. 11/428,376 Appeal Brief, Apr. 20, 2009.
Related U.S. Appl. No. 11/428,376 Examiner's Answer to Appeal Brief, Sep. 4, 2009.
Related U.S. Appl. No. 11/428,376 Reply Brief, Oct. 30, 2009.
Microsoft Corporation, "entry for 'install' (in Microsoft Computer Dictionary, Fifth Edition)", "Microsoft Computer Dictionary, Fifth Edition", May 1, 2002.
Storage Heaven (Company), "Omnidupe30usb high-speed drive duplicator", "www.storageheaven.com", Mar. 7, 2006.

* cited by examiner

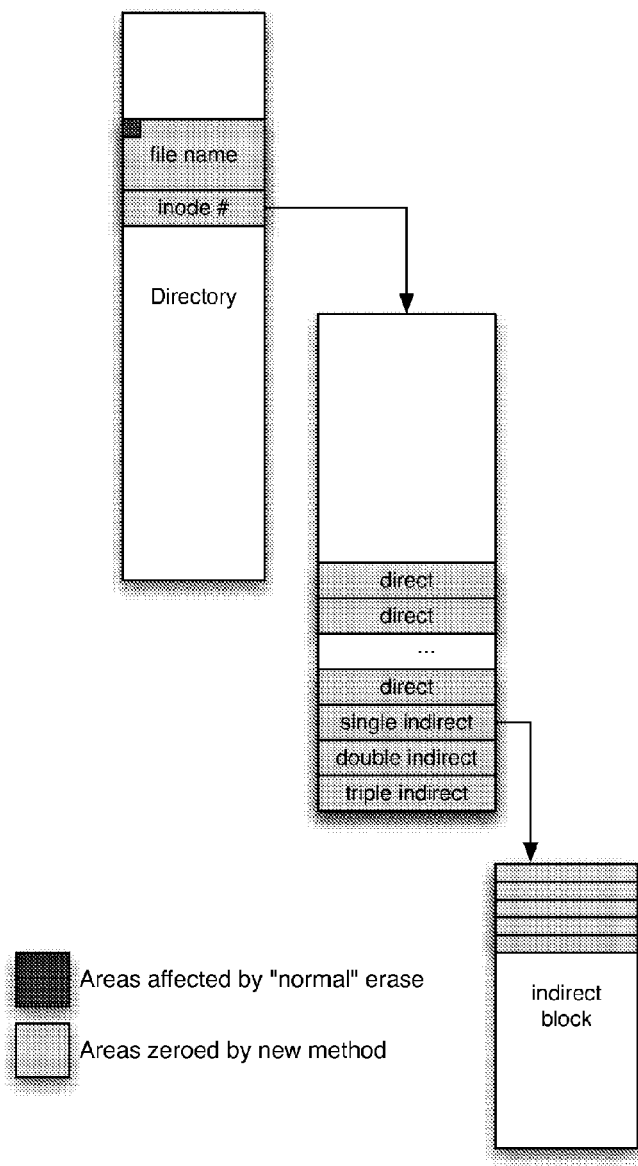
Figure 1A: Areas of ext2 file affected by selective erasure methods

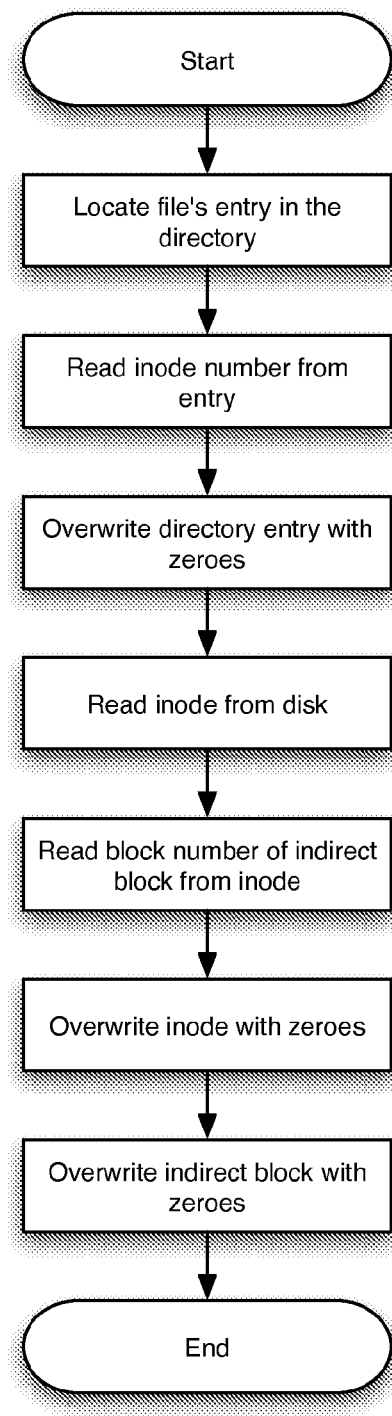
Figure 1B: Erasing a single file in ext2

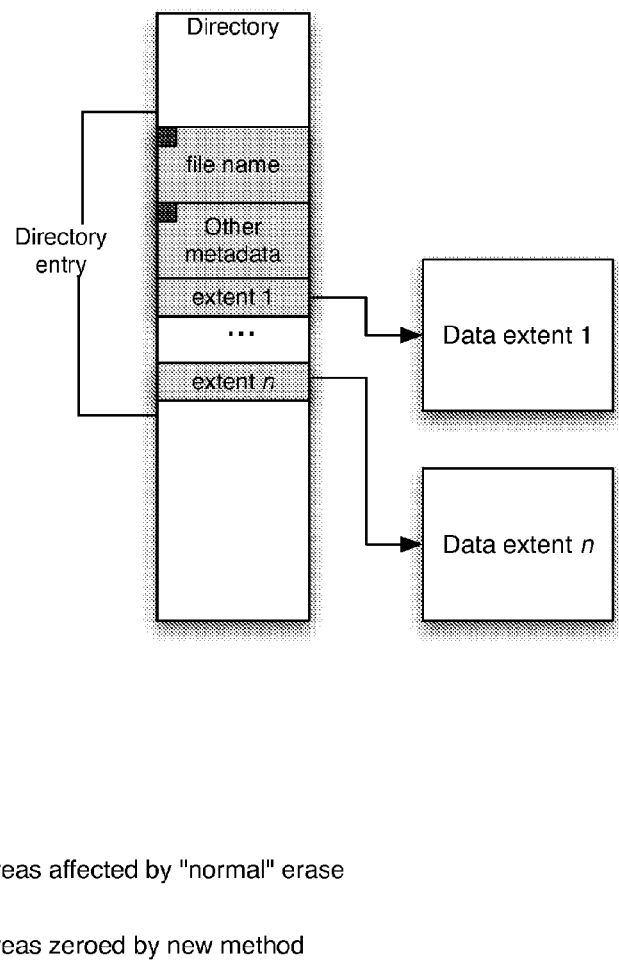
Figure 2A: Areas of UDF file and directory affected by selective erasure methods. Note that this figure does not include the "free extent" file, which is modified the same way in both the original and invented methods.

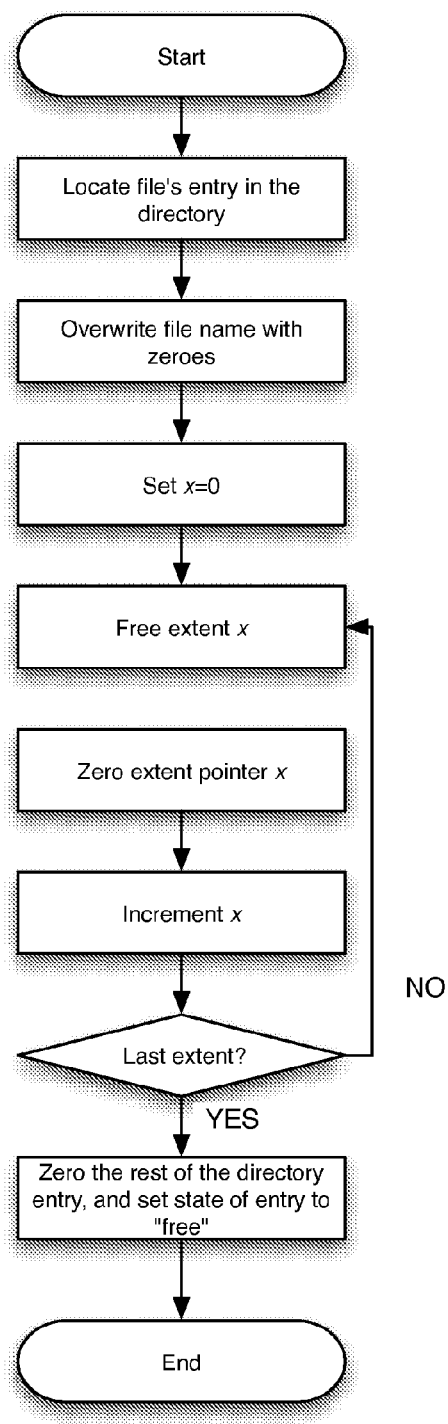
Figure 2B: Erasing a single file in UDF. This flowchart does not include all actions taken by the "standard" delete that the new method does as well.

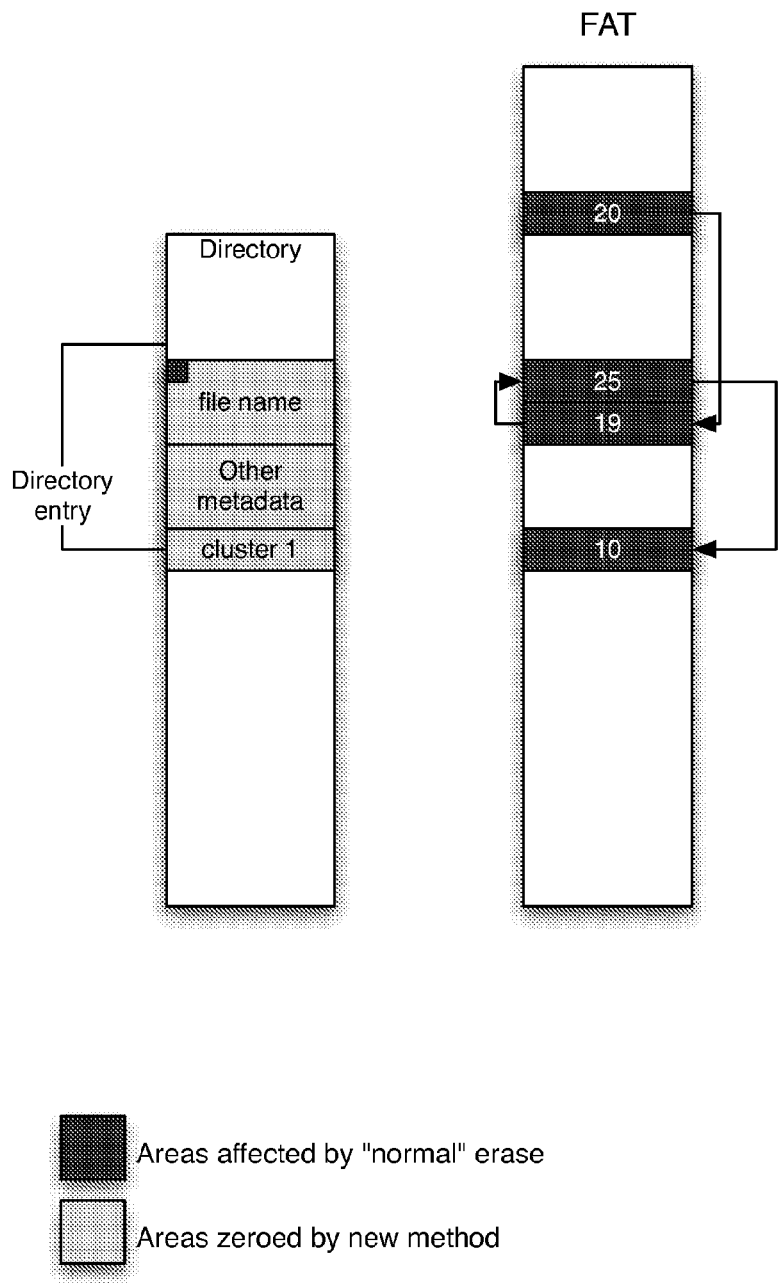
Figure 3A: Areas of FAT32 file and directory structures affected by selective erasure methods. Default behavior zeroes the entries in the FAT, but not the directory, except for the first byte of the file name.

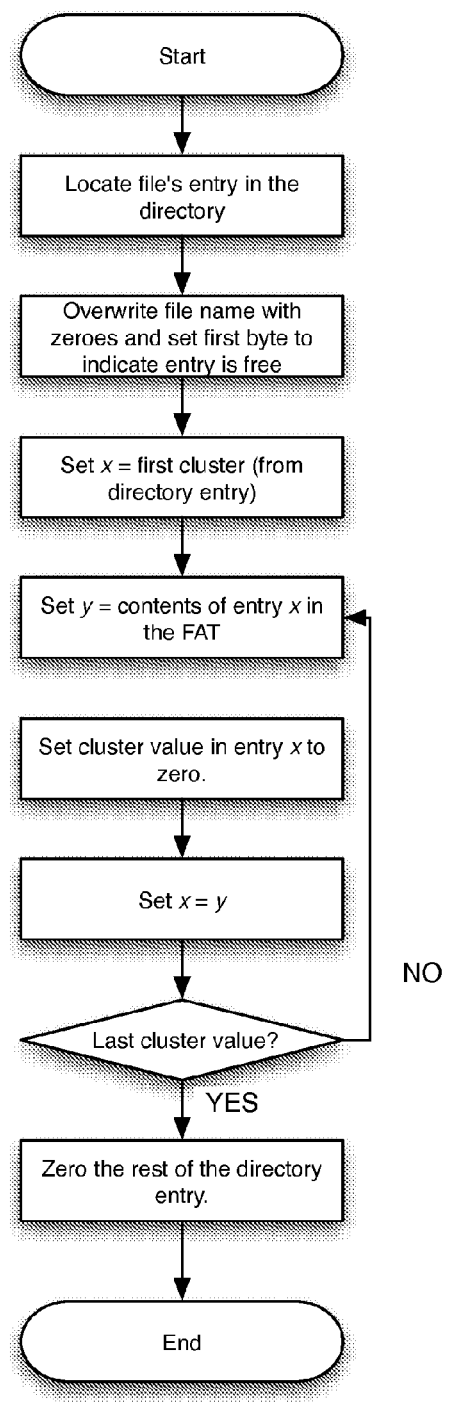
Figure 3B: Erasing a single file in FAST32. This flowchart does not include all actions taken by the "standard" delete that the new method does as well.

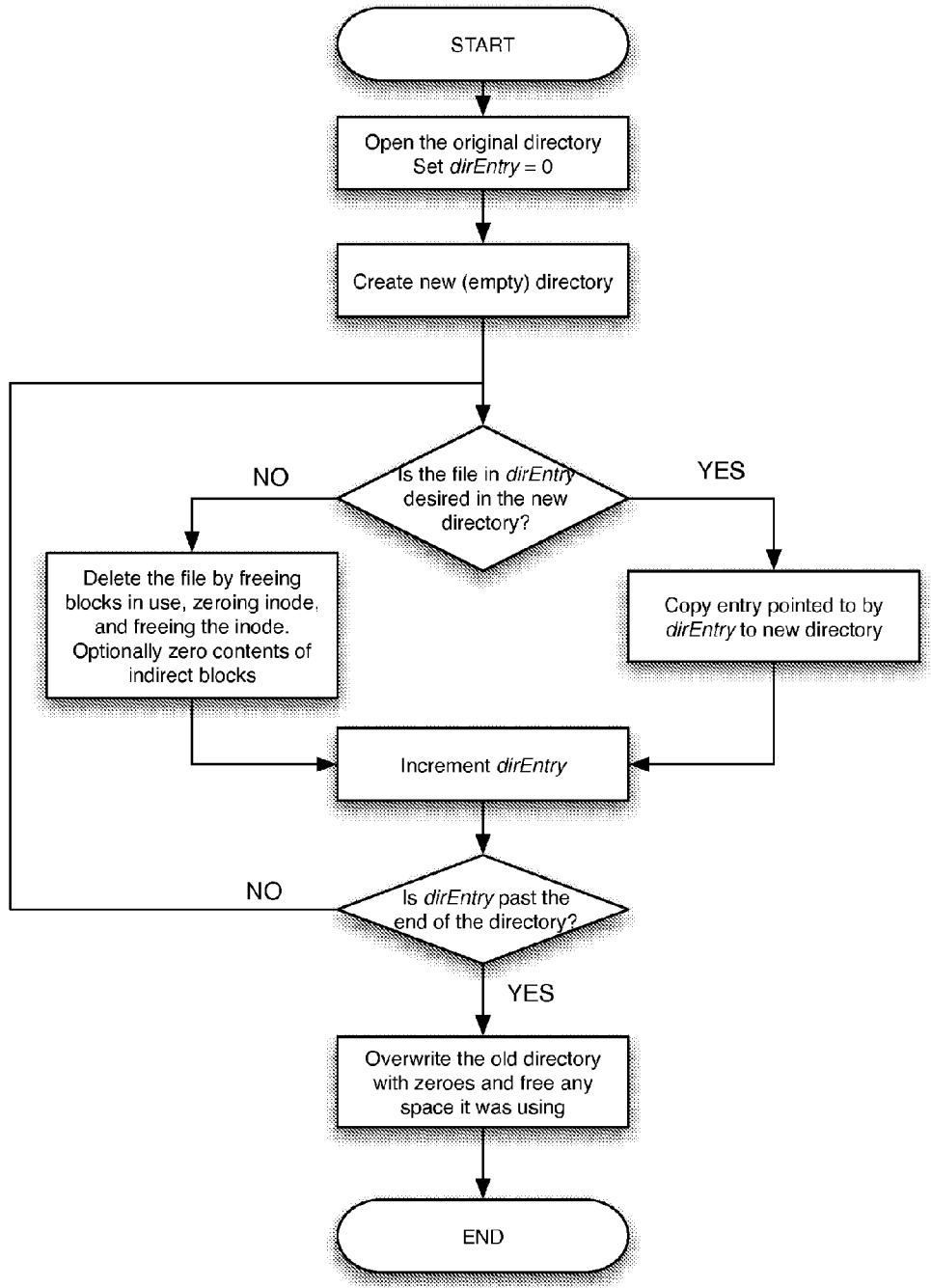
Figure 4: Deleting many files from an ext2 directory.

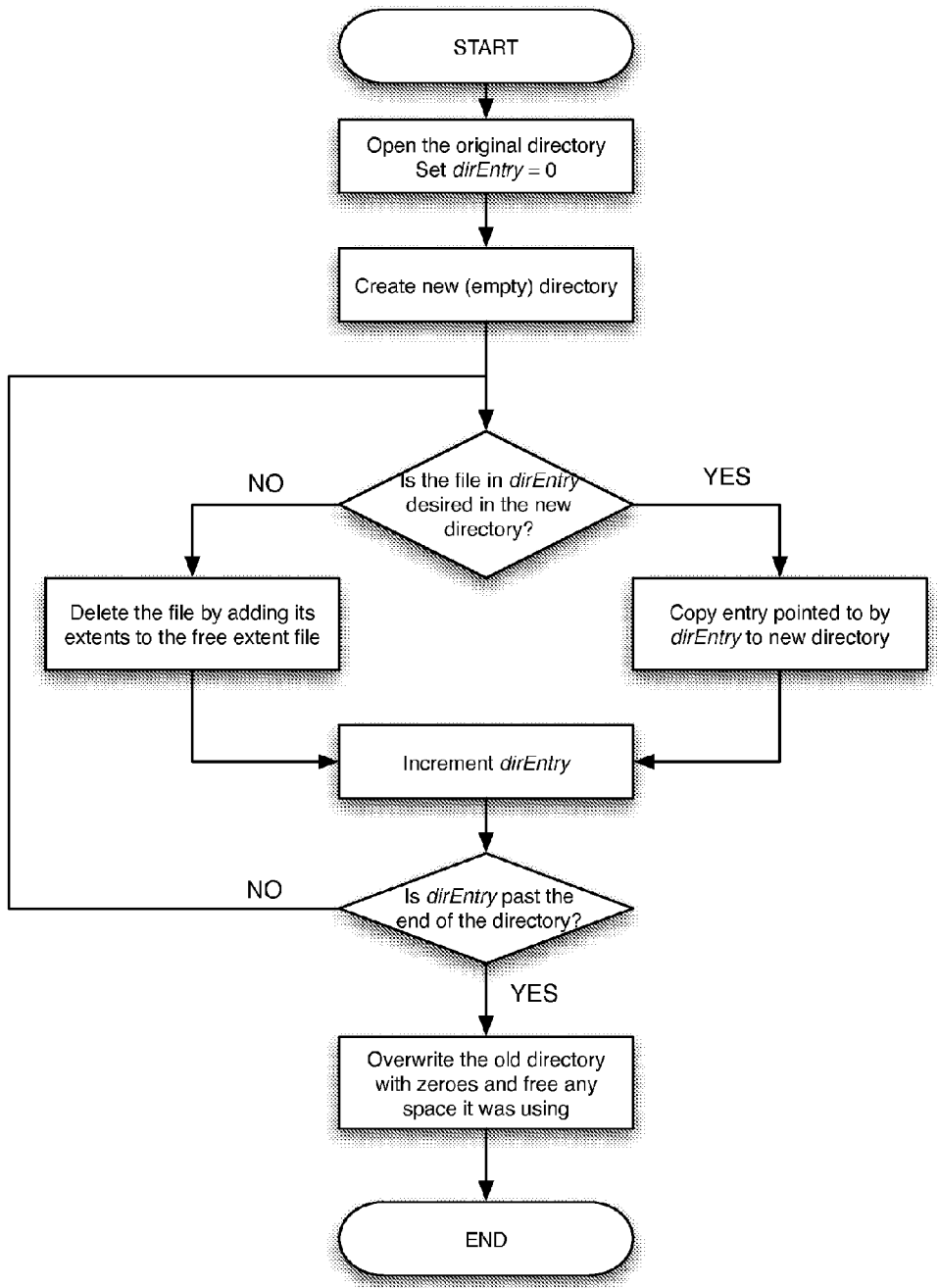
Figure 5: Deleting many files from an UDF directory.

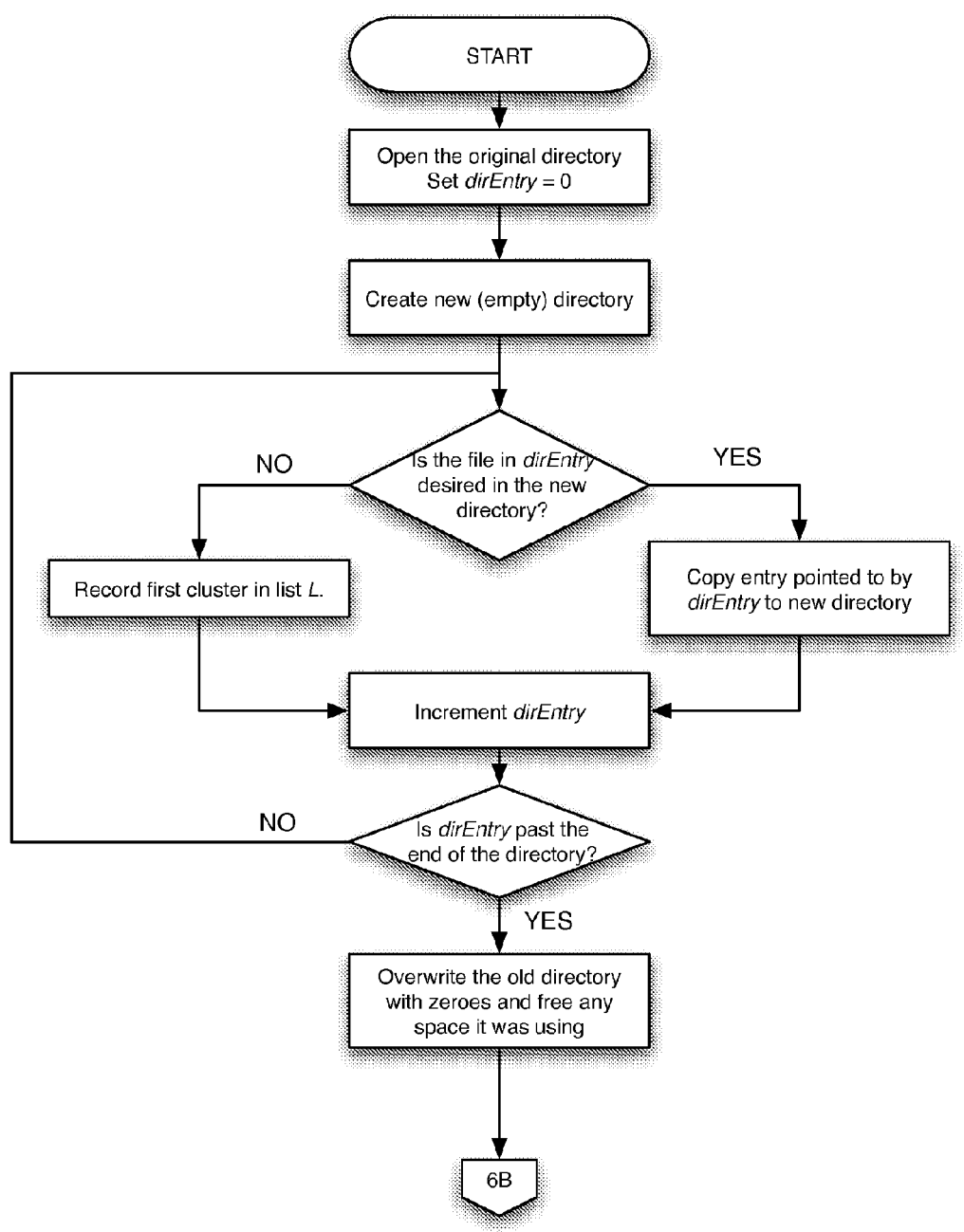
Figure 6A: Deleting many files from an FAT32 directory.

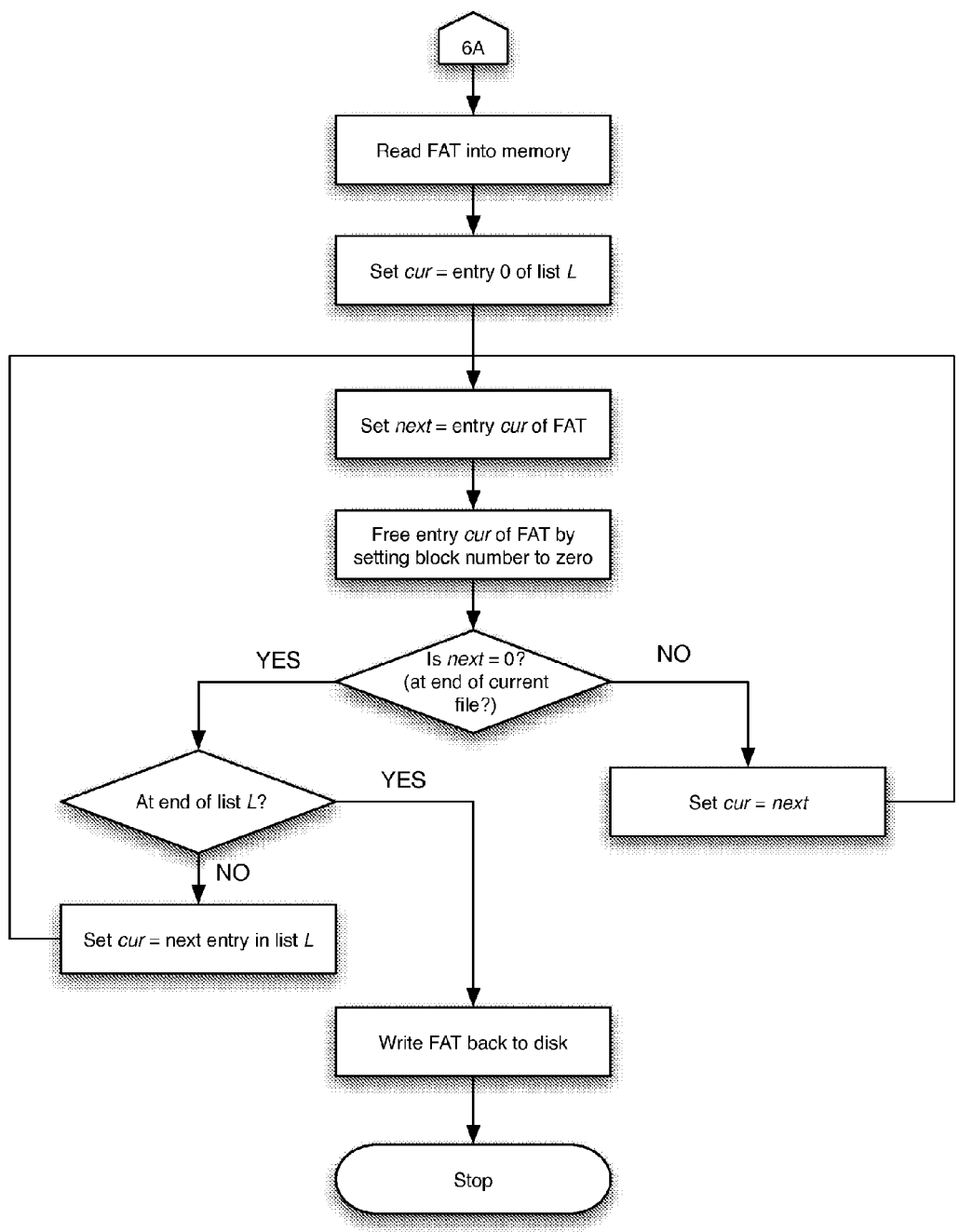
Figure 6B: Freeing blocks in the FAT after batch deletion

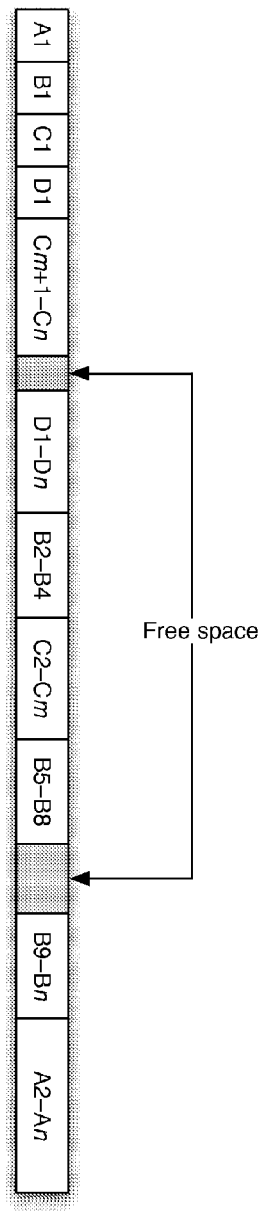

Figure 7: Data layout and free space for files A, B, C, and D. Note that the first blocks of each file are contiguous on the disk, making it faster to erase the first blocks. This approach makes it more difficult to recover usable copies of the files. Files B and C are spread across the media, making it more difficult to locate all of the blocks after deleting the metadata in the inode, directory entry, or FAT.

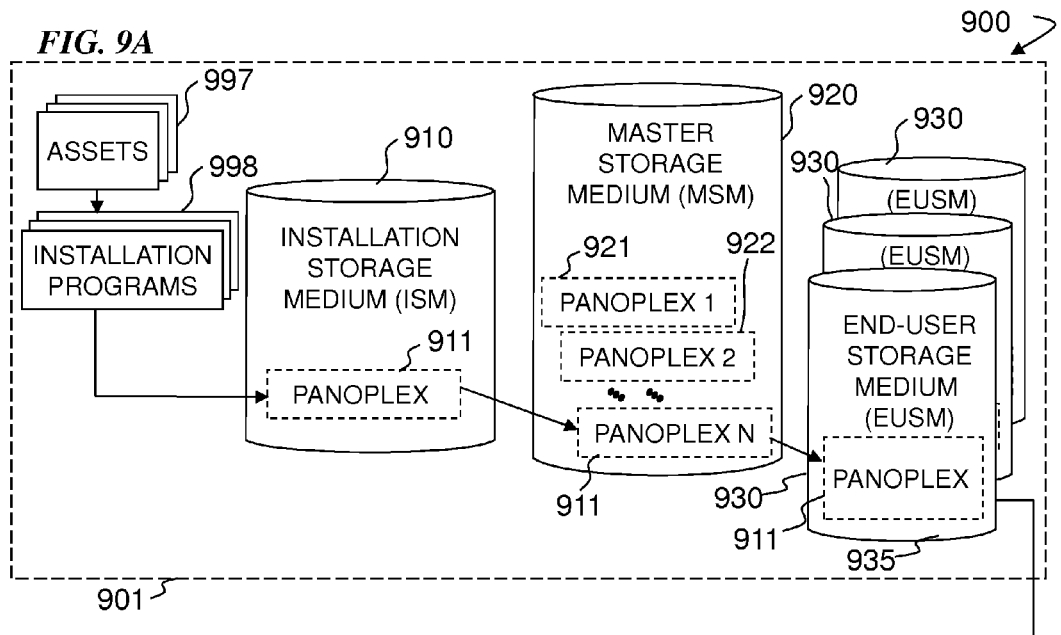
FIG. 9A
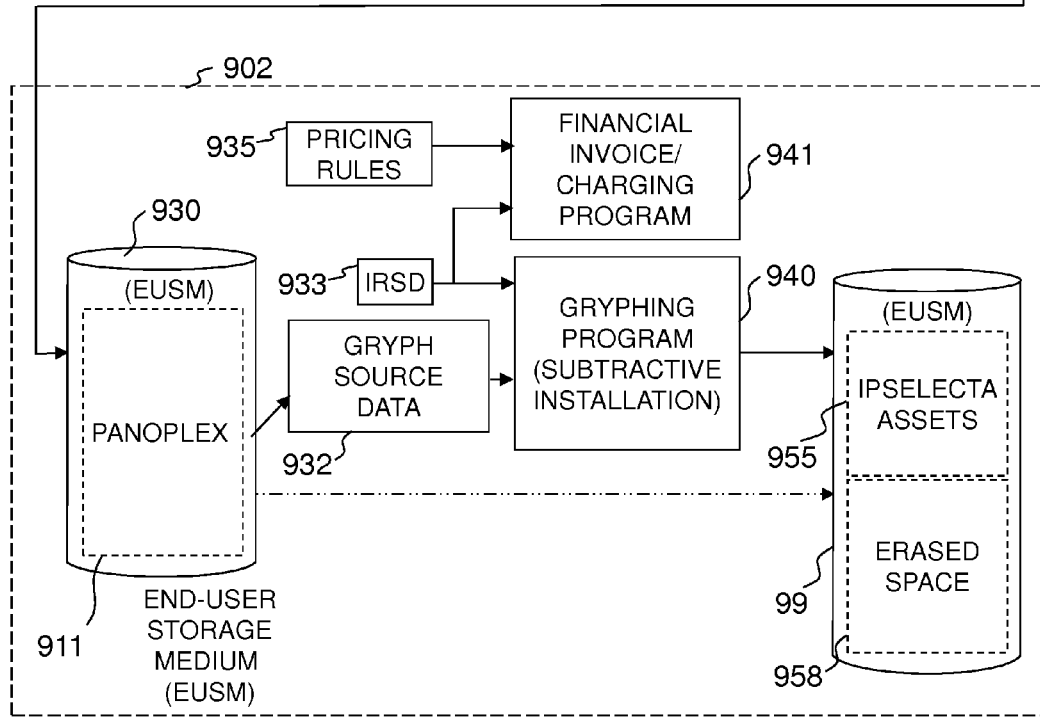

SELECTIVE FILE ERASURE USING METADATA MODIFICATIONS AND APPARATUS

CROSS-REFERENCE TO RELATED APPLICATIONS

This is a divisional under 35 U.S.C. §120 of U.S. patent application Ser. No. 13/325,820 filed on Dec. 14, 2011, titled "APPARATUS AND METHOD FOR SELECTIVE FILE ERASURE USING METADATA MODIFICATIONS" (which issued as U.S. Pat. No. 8,521,781 on Aug. 27, 2013), which is a divisional under 35 U.S.C. §120 of U.S. patent application Ser. No. 12/973,898 filed on Dec. 20, 2010, titled "METHOD AND APPARATUS FOR SELECTIVE FILE ERASURE USING METADATA MODIFICATIONS" (now U.S. Pat. No. 8,099,437), which is a divisional under 35 U.S.C. §120 of U.S. patent application Ser. No. 12/534,839 filed on Aug. 3, 2009, titled "SELECTIVE FILE ERASURE USING METADATA MODIFICATIONS" (now U.S. Pat. No. 7,856,451), which is a divisional under 35 U.S.C. §120 of U.S. patent application Ser. No. 11/611,886 filed on Dec. 17, 2006, titled "SELECTIVE FILE ERASURE USING METADATA MODIFICATIONS" (now U.S. Pat. No. 7,571,176), which claims benefit under 35 U.S.C. §119(e) of U.S. Provisional Patent Application No. 60/753,635 filed on Dec. 22, 2005, titled "RAPID DISPENSING OF STORED DIGITAL CONTENT," and of U.S. Provisional Patent Application No. 60/747,201 filed on May 14, 2006, titled "APPARATUS AND METHOD FOR SELECTIVELY DISPENSING SOFT ASSETS VIA SUBTRACTIVE INSTALLATION," each one of which is incorporated herein by reference in its entirety.

FIELD OF THE INVENTION

The present invention relates to the field of computer file system technology and, in particular, to a method, system, and program product for quickly and securely erasing files.

BACKGROUND

Computer operating systems (OS) employ file systems to associate the complexity of physical storage hardware to logical abstractions that can be more easily and uniformly manipulated. Modern file systems use a hierarchy of directories (sometimes known as folders and subfolders) and directory entries to keep track of the file names on a file system stored within diverse storage media, including magnetic hard drives, flash memory drives, or optical media such as compact disks or DVDs.

In such file systems, the directory entry for a file typically points to a list of blocks that contain the file's data. The exact format of the directory entry and block list varies with on the specific type of file system (e.g., Linux ext2, FAT32, NTFS, or UDF), but this general approach is widely used because it is simple and can track files and their contents with a minimum of overhead.

Often, it is necessary to delete files from a file system for various reasons, including the need to free up space they are using, the need to replace the file with a more recent version, and the need to remove the file so that its data will no longer be accessible to users of the file system. In order to delete a file, most file systems must accomplish two tasks: marking the file's directory entry as "unused," and making the file blocks that the file was using available to subsequently created files.

If the goal of deleting the file is to ensure that nobody can ever recover the data contained in the file, file systems completely and destructively overwrite the file's data blocks one or more times with known patterns or random data before deletion, ensuring that the contents cannot be read without disassembling the media device.

Overwriting technology is widely known. For example, U.S. Pat. No. 6,731,447 "Secure data file erasure" issued to Keith G. Bunker, et al. on May 4, 2004, and is incorporated herein by reference. Bunker et al. describe a process that ensures the destruction of data files a user wishes to completely erase from a storage medium, such as a hard drive or removable disk. A system administrator can select a quantity of and pattern to be used in overwrites of the data file so that no one can recover the data from the storage medium.

A variant of the data-overwrite approach is the encrypt overwrite approach whereby the data is not permanently lost if one possess the cryptographic key. For example, U.S. Pat. No. 5,265,159 "Secure file erasure" issued to Kenneth C. Kung, on Nov. 23, 1993, and is incorporated herein by reference. Kung describes a method of securely deleting a file on a storage medium of a computer system so that it is not readable, wherein an encryption algorithm is used to encrypt the data in the stored file prior to a conventional deletion process. His invention permits a user to erase files from a permanent storage space in a manner that makes the file totally unreadable by others. When a user requests deletion of a stored file, the file is encrypted so that it is not readable. The user has an option to undelete the file by decrypting the file as long as this operation is done before the storage space is used by another program.

While these data overwriting approaches to file deletion are very secure, they also very slow, being roughly linear in speed to the amount of data erased. Erasing via overwriting all of the files on a 500 gigabyte hard drive in this fashion can require many hours. Encrypting is slower yet as it requires additional compute resources in addition to the data overwriting time.

Instead, nearly all modern file systems take a much simpler, but less secure, approach: they mark directory entries as "unused" and leave most of the other structures on disk untouched. This approach sets a flag in the directory entry, typically changing a single word on disk, and writes the directory entry back to disk. At this point, the file is considered deleted from the point of view of a file system user and the directory entry is available for reuse for future files that might be written, but the entry is largely unchanged otherwise.

After marking the directory entry as "unused," the file system must also make the blocks that the file was using available for use by other files. This can be done in several ways, the most common of which are a bitmap or a free list. In file systems such as Linux ext2, a bitmap records uses a single bit for each block in the file system, with one value (1, for example) indicating that the corresponding block is free, and the other value (0) indicating that the corresponding block is incorporated into a file and thus unavailable for use. In such a system, the file system frees the blocks associated with a file by setting the bits associated with the blocks to 1. This marking is arbitrary but consistent within a file system. Other systems, like NTFS, may use the opposite convention.

No other activity is necessary; thus, file systems concerned with efficiency do not destroy the structures in the blocks themselves that describe the relationship of the blocks to the now-deleted file. This approach makes it straightforward to recover a file that has been deleted if no other files have reused the directory entry or media blocks; however, this is a drawback if the file should not be recoverable. The second kind of file system, such as UDF, maintains a list of blocks that are available (UDF actually uses extents—ranges of blocks—rather than individual block numbers, but the approach is the same). The identifiers for blocks that were used in the now-deleted file are added to the list of blocks available for reuse without necessarily altering the data within the blocks themselves. Not changing block content makes it straightforward to recover the file and its contents using the flagged directory entry and associated (unmodified) block pointers, as long as the data blocks have not been reallocated to another file.

What is needed is a rapid means to erase files singly and in batch while making file recovery very difficult but not necessarily impossible. This protects non-unique digital assets by making data recovery cost more than the replacement value of the digital assets at risk, such as commercial software programs, music tracks, video, and still pictures and the like. By escalating piracy effort from a brief, self-service utility approach to an day-long, expert effort equipped with a $250,000 suite of tools, then a potential pirate more likely would just buy a fresh software package, music track, or movie rather than attempting to restore deleted files.

SUMMARY OF THE INVENTION

In accordance with the present invention, substantially all file information mapping logical to physical storage is deleted. One embodiment is directed to a method for rendering data stored on a storage medium inaccessible. The method includes but is not limited to destroying metadata that identifies a location on the storage medium at which the data is stored such that at least a portion of the data cannot be located on the storage medium by reading of metadata; and leaving a substantial portion of the data intact on the storage medium upon completion of the method. Other embodiments provide fast selective bulk erase and make data harder to recover. These methods work particularly well for creating unique distributions of files derived from a common base.

BRIEF DESCRIPTION OF THE DRAWINGS

FIG. 1A is a schematic of areas within an ext2 file system affected by selective erasure.

FIG. 1B is a flowchart relating to erasing a single file in an ext2 file system.

FIG. 2A is a schematic of areas within a UDF file system affected by selective erasure.

FIG. 2B is a flowchart relating to erasing a single file in a UDF file system.

FIG. 3A is a schematic of areas within a FAT32 file and directory structure affected by selective erasure methods.

FIG. 3B is a flowchart relating to erasing a single file in a FAT32 file system.

FIG. 4 is a flowchart relating to erasing multiple files in an ext2 file system.

FIG. 5 is a flowchart relating to erasing multiple files in an UDF file system directory.

FIG. 6A is a flowchart relating to erasing multiple files in an FAT32 file system directory.

FIG. 6B is a flowchart relating to freeing blocks in an FAT32 file system after batch deletion.

FIG. 7 is a data layout schema for enhancing batch deletion.

FIG. 9A is a block diagram of a panoplex-generation and panoplex-gryphing process 900 for creating a storage medium 99 having a customized and/or user-selected set of soft assets.

DETAILED DESCRIPTION

Figure 8A:
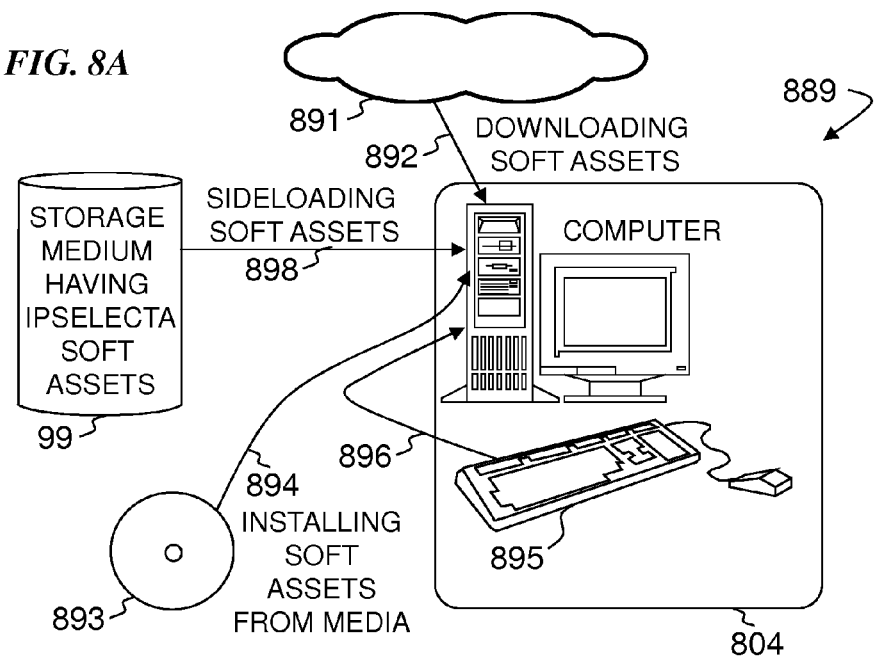
FIG. 8A is a block diagram of a sideloading process 889 for dispensing soft assets into a personal computer or similar information-processing device.

Although the following detailed description contains many specifics for the purpose of illustration, a person of ordinary skill in the art will appreciate that many variations and alterations to the following details are within the scope of the invention. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

In accordance with the present invention, we offer a unique approach to deleting files through altering file metadata that is not as secure as totally overwriting the data in the files, but is significantly more secure than loosely flagging directory entries and marking data blocks as unused. This approach is significantly faster than secure deletion via data overwriting, and approaches and in some cases surpasses the speed of traditional file deletion via flagging entries.

As a first approximation, standard erasure time is linearly proportional to the number of files to be erased. Secure, destructive erasure time is linearly proportional to the size of the files to be erased. Using our file metadata erasure approach, erasure time is linear to number of files for small numbers of files. However, when a substantially large number proportion of files within a directory are erased, elapsed time will peak and decline making erasure times shorter and more predictable.

As used herein, erasing includes writing zeros or other data patterns to some or all of the location(s) of data, thereby displacing and/or overwriting the previous data and making that previous data unreadable and unavailable; performing an erase operation (such as are available on certain types of electrically erasable programmable read-only memory chips) that erases one or more entire blocks of data at once; setting status indicators (such as certain bits in a directory entry) that are interpreted and enforced by operating-system software as indicating that the storage locations of the data are not readable as data or instructions; and/or other suitable methods.

In some embodiments, the present invention provides an erasure mechanism that is more expensive to defeat than the cost of the erased content. The cost of a conventional undeletion of a conventionally deleted file can be trivial. Accordingly, a more-secure mechanism should be used. The cost of defeating high-security erasure could be many times greater than the value of the erased panoplex content, but the use of high-security erasure exacts a toll on the manufacturer or retailer in terms of throughput (e.g., machines per hour) of the customization process. Accordingly, a more efficient erasure mechanism is needed.

In some embodiments, removal of extraneous content of the panoplex uses a secure, quick erase that overwrites file directory information that would otherwise allow file reconstruction. Such directory information includes any file-in-use flag; file length; file-folder location; and cluster-allocation pointers. Such an erasure foils normal undelete programs and makes any attempt to reconstruct the content more costly than the cost of acquiring the content.

Deleting Single Files

Individual files are deleted by overwriting the entire directory entry with zeroes, rather than just setting a flag or byte in the directory entry. For the ext2 file system, this approach will destroy the file name and index node (inode) number of the file. For more complete security, the inode for the file should also be overwritten with zeros, hiding the file size, and the locations of the first 12 blocks in the file along with the location of extra block lists used to locate file blocks for files larger than 48 kilobytes. In ext2, this approach requires a single additional disk access to overwrite the inode with zeros; the time needed to write the zeros to the copy of the block in memory before writing it back to the media is negligible. Additional security can be obtained by overwriting the first block list of the deleted file (the "single indirect block") with zeros, hiding the identities of the blocks that make up the first 4 megabytes of the file. This changes made to the directory entry, inode, and file blocks are shown in FIG. 1A, with a flowchart in 1B. Note that FIGS. 1A and 1B elide the activities normally associated with deleting a file in ext2, including the manipulation of the free block bitmap; these operations are / remain unchanged.

Deleting a single file in a UDF file system can be done similarly. Directories and file entries in a UDF file system are typically stored in a separate "metadata partition," and each file entry contains the locations of the extents (an extent is a set of 1 or more contiguous blocks). As in ext2, a directory entry contains a file name and a pointer to the file's file entry, which is similar to an inode in ext2. Each file entry can be up to one block long, so it is rarely necessary to place extent locations anywhere other than the file entry itself. In a UDF file system, overwriting the entire directory entry with zeros and then marking the directory entry as unused will obscure the existence of the file name and the location of the file entry, and can be done as quickly as a standard fast deletion that only marks the directory entry as unused. If greater security is desired, the file entry can be overwritten with zeros, effectively hiding the location of the contents of the file to which the entry pointed. All of these activities are done in addition to the normal actions taken when deleting a file in a UDF file system, including the addition of the location of the freed blocks to the free block list. The modifications made to the directory entry and file entry are shown in FIG. 2A, with a flowchart in FIG. 2B. As with ext2, FIGS. 2A and 2B elide operations associated with normal deletions.

Deleting a single file in a FAT32 file system is similar to the operation in ext2 and UDF. The directory entry for a file in FAT32 contains the file name (with a possible extension to successive directory entries for long file names) along with attributes including the number of the first cluster (block) of the file's data. The file can be deleted by setting the first letter of the file name to a certain value (0.times.E5); however, this approach makes it trivial to recover the file's name, location, and size. Our approach sets the entire directory entry to zero, and with 0.times.E5 subsequently written to the first byte of the directory entry, marking the entry as available, as shown in FIGS. 3A and 3B. This approach completely hides both the file name, file size, and the location of its first cluster. As with a normal FAT32 file erase, the allocated cluster chain must be traversed and zeroed to free the blocks of the deleted file. This operation also makes it more difficult to recover a file by simply scanning the FAT. It is particularly strong when many files are deleted from a full file system. Metadata processing is here assumed to apply to both long and short name entries and both the primary and secondary FAT tables.

Deleting Large Numbers of Files

Altering directory entries individually works well for deletion of individual files, but can be optimized better for deleting large numbers of files, as might be done for distribution of a relatively few files from a well-populated, relatively large storage medium. In such a case, the original directory structure might contain thousands of files, but each individually distributed disk might only retain relatively few files. Rather than produce totally new media for each such distribution, the construction of a new directory containing only the desired files could be used to quickly build a disk that contains just the desired files.

This goal can be accomplished by constructing a list containing the files that will be included in the new directory and scanning the original directory, copying only the desired files to a new directory. The original directory can then be deleted using metadata deletion or destructive deletion thus bulk erasing numerous files at once. The algorithms for the specific file systems listed below assume that the system has already assembled or been given a list of files to keep in the new directory. This list can be kept in any form; however, it is more efficient for the program doing the copying to keep the list in a hash table. It is possible to check whether a particular string (file name) is in the hash table in constant time, allowing the following procedures to run in time linearly proportional to the number of files in the original directory.

For an ext2 file system, a new (empty) directory is created, and the original directory is opened. Next, the process goes through each directory entry in the original directory in turn. If the file referenced by the directory entry is desired to be kept, the directory entry is copied from the old directory to the new directory. If the file referenced by the directory entry is not desired, the file may be optionally deleted as described above. This step might be unnecessary if the file system will not need to accommodate additional files, but is a good idea to keep the location of the deleted files from future users. After all of the entries in the old directory have been scanned, the old directory is deleted either through destructive or metadata erasure. This approach is illustrated in FIG. 4.

The procedure for deleting multiple files is similar for a UDF file system. As above, a new (empty) directory is created, and the original (old) directory is opened. The user then examines each directory entry in turn, copying the entry if it is to be kept and optionally deleting the file if it is not desired in the new directory. After all directory entries have been examined, the old directory is deleted as above. This algorithm is shown in FIG. 5.

Deletion of many files in FAT32 also proceeds by creating a new (empty) directory and opening the original directory. The process then examines each directory entry in turn, copying the entry if it is to be kept and optionally deleting the file if it is not desired in the new directory. Deletion in this case consists of recording the first cluster used in the deleted file in a list. After all entries in the original directory have been examined and optionally copied to the new directory, the process reads in the FAT and deletes all of the files by starting at each deleted file's first cluster and following the pointers through the FAT, marking each visited pointer as free by zeroing it. By grouping all of the modifications to the FAT together, this approach can be much faster than deleting each file separately. This algorithm is shown in FIGS. 6A and 6B.

The above procedures work on a single directory, but many file systems contain large numbers of directories. In order to apply the above procedures to a tree of directories, the procedures should be applied recursively, with a directory being processed after all of its subdirectories have been processed. If this is done, empty directories can themselves be deleted and zeroed, further hiding the location of on-disk information.

If an entire FAT32 file system is processed recursively, as described in the previous paragraph, an additional optimization can be applied. The procedure listed above requires that each file be deleted individually. However, if an entire FAT32 file system is processed and only a few files are to be kept, the entire FAT32 can be rebuilt. In this approach, the list of files to be kept contains all of the files to be retained in the entire file system; thus, the new FAT contains only the information for the files in the list. If there are few files to be kept and many to be deleted, it will be faster to start with a "clean" FAT in which all blocks are marked free, and to then traverse the original FAT for each file to be kept, copying the information for each block in each file to be kept from the original FAT to the new FAT. Any directories to be created can then use blocks still marked "free" in the new FAT. The cross-over point for which approach is faster (delete individual files, or start with a "clean" FAT) varies and can be determined experimentally for a given system. In general, small list of files to be kept will be more quickly done by starting with a "clean" FAT, and that a system in which relatively few files are to be deleted will be handled more quickly using the approach in FIGS. 6A and 6B.

In some embodiments, a customized storage medium is formed by subtractive installation of soft assets, wherein the storage medium is preloaded with a superset of possible soft assets (a collection of available content called a "panoplex"), and is then gryphed to remove non-selected soft assets (creating erased space that can then be used for other data) and to retain selected assets (which are thereby substantially ready to use without substantial effort or additional input from the end user).

Consider a manufacturer of computers. In one instance, the business plan calls for build-to-order operation. Hard drives are components provided by a disk-drive manufacturer. In one method of this invention, the contract with the drive supplier can include preloading the selected panoplex into the drives and delivering these to the computer manufacturer. Alternatively the drives pass from the drive supplier to a contract manufacturer that loads the panoplex onto a disk. Alternatively, the original-equipment manufacturer (OEM), i.e., the brand-name manufacturer, loads the panoplex onto the drives. When an order is received from a customer, the order includes an indication of the customer's selection of the desired content. On the production line, the necessary customization is accomplished and the finished machine with the desired programs installed is delivered. In another instance, a manufacturer who builds computers to place in their inventory will store the finished machines; each loaded with the selected panoplex, and will later customize the devices, as needed, before shipping.

In some embodiments, one or more data-encryption, sequestering, or other protection methods are used to prevent access to the soft assets contained within the end-user storage media unless and until a gryphing program is run on each end-user storage medium. In some embodiments, a "blank" directory structure is written to a default location used by an operating system for the directory of the end-user storage medium, such that the storage medium appears to be substantially blank if used as is by that operating system. Directory data for the panoplex is written elsewhere on the end-user storage medium or on an external storage device, such that the gryphing program can access the panoplex directory data, gryph it, and write it to the default location used by the operating system for its directory.

Obfuscating File Structure

In all of these scenarios, after file deletion, the data itself will still exist on the media, but would require considerable effort to recover. Nonetheless, in certain applications, be prudence might dictate taking additional precautions to make recovery of intact but erased files more difficult. Certain practices are particularly useful.

For example, many file systems, particularly those that utilize optical media, store the contents of a file in contiguous blocks on the media. In such a case, recovery simply consists of finding the first block of a file; the remaining blocks follow sequentially. To combat this problem, the blocks of a file should be written non-contiguously. To ensure that performance is still acceptable, however, the file could be stored as non-contiguous extents of reasonable size, say 128 kilobytes to 4 megabytes, making reassembly of the files without usable metadata much more difficult. It is important to note that data in such a file system is still potentially recoverable, but the cost and effort necessary to recover it should exceed the value of the files deleted in such a way.

Another approach to obfuscating file structure is to overwrite selected file blocks to make recovery more difficult. Overwriting just a few blocks in a large file can make the file unusable, especially if the file contains program code. This could be accomplished by overwriting the first block of the file and a small number of subsequent blocks with patterned or random bits. Overwriting the first block obscures the type of the file as well as information about the file's size, entry points, checksum, metadata tags, and other critical information. Overwriting a small number of subsequent blocks can render the entire file useless, particularly if the file contains executable program code. This technique can be used with any of the deletion mechanisms listed above to make file recovery considerably more difficult.

The two approaches above are best combined by storing the first blocks of many files near one another, with the remainder of the files spread across the media. In this way, the first blocks of many files could be overwritten by writing patterns or random bits to large sequential chunks of the media. Since sequential writes are often much faster than writes to non-consecutive locations, this approach has the advantage of being able to obfuscate many files relatively quickly. In addition, the non-sequential storage of individual files would make it more difficult to locate them without the metadata that describes the location of the deleted files' contents. A diagram of this technique is shown in FIG. 7. Optionally after deletion, background storage defragmentation can be scheduled or immediately performed, to improve file access to the remaining unerased files. Furthermore, with Windows implementations, an optional cleanup of the Windows Registry to remove linkages or indicia to any of the erased files or programs is suggested.

FIG. 8A is a block diagram of a sideloading process 889 for dispensing soft assets into a personal computer 804 or similar information-processing device, for example, a new device being purchased by its initial user. Conventional methods for dispensing soft assets into a personal computer 804 occasionally include downloading 892 of soft assets from a network 891. For example, network 891 could be a manufacturer's internal network used to preload soft assets into a device being assembled. Further, software and music are commonly available for purchase (or even for free, in some cases) and immediate download from the internet 891 via a process of "downloading." Conventional methods also include media-installing 894 of soft assets from physical media 893 (e.g., CDROM, diskette, FLASH memory, and the like), sometimes also requiring substantial amounts of manual input 896 from a user via an interactive input device 895 (such as a manual keyboard). It takes a considerable amount of the user's time and mental energy (the drain on the user from the concentration needed to perform the various unfamiliar tasks, as well as the boredom from waiting for the process to complete), as well as power from the electrical grid needed to download and install a large selection of soft assets from the internet 891, or to install soft assets from media 893 and/or manual input device 895.

In contrast, one aspect of sideloading process 889 of the present invention provides sideloading 898 of soft assets, wherein a large set (an "ipselecta") of soft assets are in effect loaded en masse onto a storage medium 99 that is operatively coupled to computer 804, either before or after the ipselecta are loaded. For example, in some embodiments, storage medium 99 includes a disk drive and/or FLASH card or chip (e.g., a SanDisk®, TransFlash® or microSD® card) or any other suitable storage medium that is preloaded (for example, as described below for FIG. 9A or FIG. 9B below), then plugged into an appropriate slot and connected by appropriate signal and power cabling to other hardware in computer 804, resulting in an operational, ready-to-use device 804. This saves a considerable amount of time (thus increasing manufacturing throughput and/or reducing the time spent by the user waiting for his or her purchase to become usable) and electrical energy for the manufacturer and/or end-user by avoiding much or all of the downloading manual, and/or media installing of soft assets. In some embodiments, however, the sideloading of the present invention is supplemented by also downloading and/or manually installing and/or media installing soft assets that were not in the ipselecta.

Figure 8B:
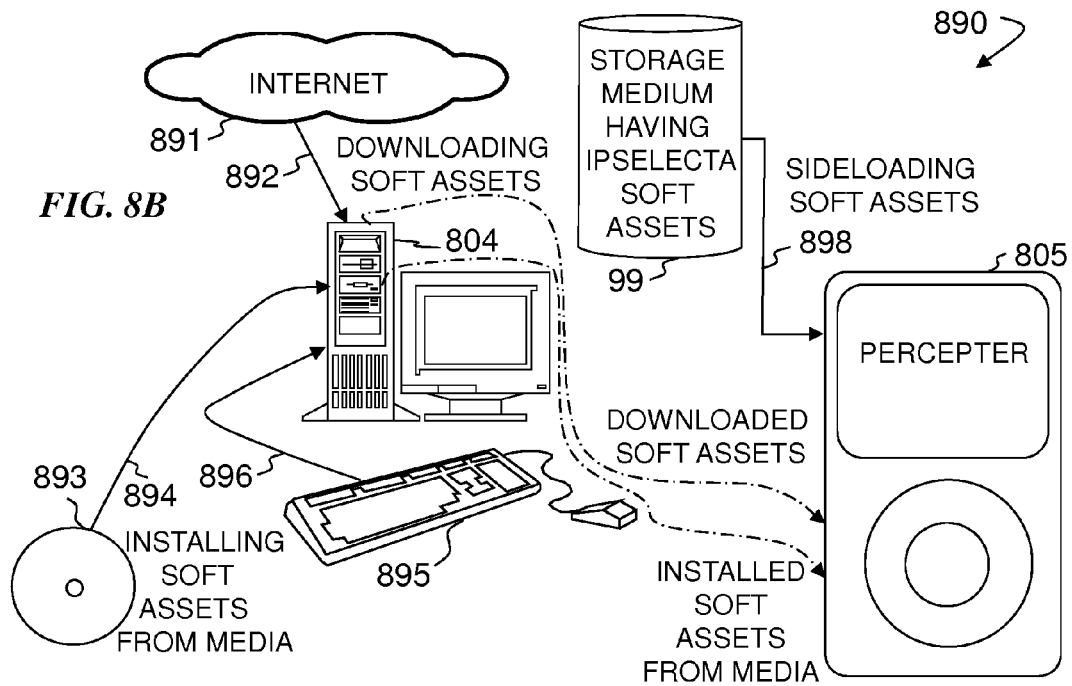
FIG. 8B is a block diagram of a sideloading process 890 for dispensing soft assets into a percepter or similar device.

FIG. 8B is a block diagram of a sideloading process 890 for dispensing soft assets into a "percepter" 805 or similar device. Percepters are devices such as MP3 players, multi-function cell phones, video players and the like that provide sensory stimulation to a user's senses (i.e., sight and sound, as well as touch, smell, temperature, and the like). Process 890 is similar to process 889 of FIG. 8A, except that often an intermediate device such as computer 804 is required as a download intermediary between network 891 and percepter 805 for downloaded "percepta" (such as songs or other audio and/or video files) or other soft assets. An intermediate device such as computer 804 is also frequently required as a media-install intermediary between physical media 893 and percepter 805 for manually installed soft assets (such as songs that are read from a music CD, compressed (or "ripped"), and loaded into a playlist on an MP3 player).

In contrast, one aspect of sideloading process 890 of the present invention provides direct sideloading 898 of soft assets, wherein a preloaded storage medium 99 is operatively coupled to percepter 805, either before or after the ipselecta are selected and made available. For example, in some embodiments, storage medium 99 is preloaded (for example, as described below for FIG. 9A or FIG. 9B), then plugged into an appropriate slot and connected by appropriate signal and power cabling to other hardware in percepter 805 (which is, in some embodiments for example, a cell phone and/or music player), again resulting in an operational, ready-to-use device. In some embodiments, the sideloading into a percepter is supplemented by also downloading and/or manually installing soft assets that were not in the ipselecta.

Figure 9B:
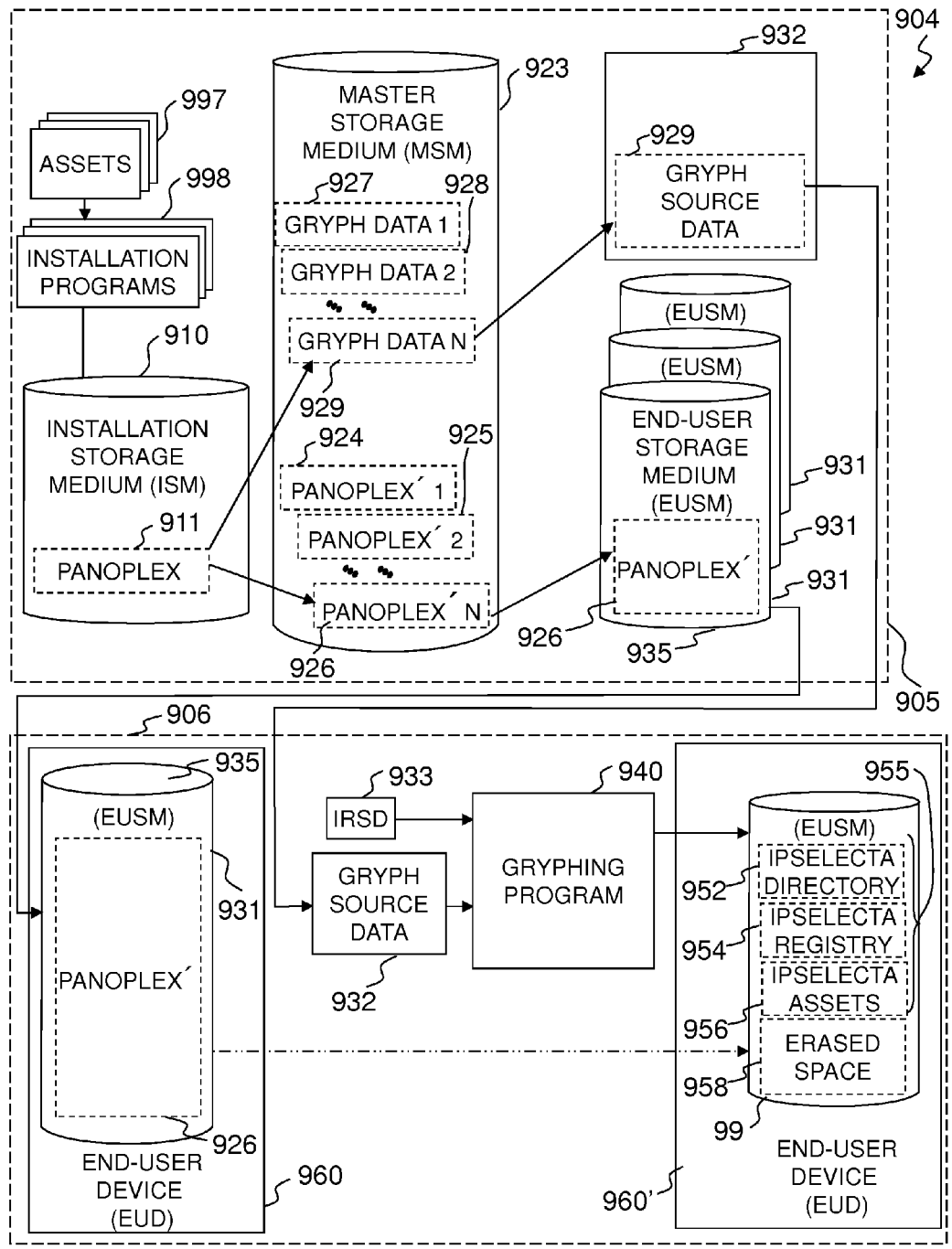
FIG. 9B is a block diagram of another panoplex-generation and panoplex-gryphing process 904 for creating a storage medium 99 having a customized and/or user-selected set of soft assets.

FIG. 9A is a block diagram of a process 900 for creating a storage medium 99 having a customized and/or user-selected set of soft assets 955. In some embodiments, storage medium 99, once completed, is sideloadable according to the descriptions for FIG. 8A and FIG. 8B above. In some embodiments, process 900 includes a panoplex-generation process 901 and panoplex-gryphing process 902. In some embodiments, a plurality of soft assets 997 is installed into an installation storage medium (ISM) 910 using one or more installation programs 998. In some embodiments, this operation is performed with ISM 910 coupled to and controlled by a device that is similar to the final device 960 (see FIG. 9B). The result of installations is a panoplex 911 stored on ISM 910. In some embodiments, ISM 910 is an initially blank, formatted storage medium onto which a plurality of soft assets (e.g., software programs or MP3 songs) is installed using one or more installation programs 998. In some embodiments, panoplex 911 is then copied to a master storage medium (MSM) 920 having one or more other panoplexes (e.g., panoplex 921 and panoplex 922) stored thereon. In some embodiments, ISM 910 is then reformatted and again used to create a different panoplex having a different set of soft assets.

In some embodiments, an inventory of at least one blank end-user storage medium 935 is converted to intermediate workpiece 930 by copying into it the data for panoplex 911 (e.g., the software portion) from MSM 920. For example, blank end-user storage medium 935 is, in some embodiments, a disk drive or FLASH card that is part of the complete hardware 960 for the final user device (i.e., it is a complete hardware combination 960 with an embedded blank storage medium as described in FIG. 9B). In other embodiments, it later becomes part of the complete hardware 960 (i.e., it is a stand-alone storage medium 935 (hardware) that is to be first loaded with panoplex 911 (software) and is then later connected to the rest of the device hardware). Individual ones of the inventory of intermediate workpieces 930 are supplied, as needed, to panoplex-gryphing process 902. That is, a blank end-user storage medium 935 becomes, by copying a panoplex 911 onto it, an intermediate workpiece 930, and this becomes, after gryphing to remove relicta data, gryphed storage medium 99.

In some embodiments, panoplex-gryphing process 902 includes obtaining a set of gryph source data 932 from the panoplex 911 on an intermediate workpiece 930, obtaining ipselecta-relicta selection data (IRSD) 933 that indicates the selections of soft assets of a particular user, and gryphing the panoplex 911 by using gryphing program 940 to achieve subtractive installation. The subtractive installation performed by gryphing program 940 culls the relicta (the soft assets that are to be removed), leaving erased space 958 in the place of the culled soft assets, and retaining the ipselecta 955 (the soft assets selected to be retained) to obtain a gryphed storage medium 99. In some embodiments, for example, the gryph source data 932 includes the data for the directory and the registry, and the gryphing program removes the directory entries and the registry entries for the relicta, and then writes the resulting directory and registry to their respective locations (i.e., the locations on the storage medium where the operating-system software expects to find this data) on intermediate workpiece (storage medium) 930, thus forming the gryphed storage medium 99. That is, a blank end-user storage medium 935 becomes, by copying a panoplex 911 onto it, an intermediate workpiece 930, and this becomes, after gryphing to remove relicta data, gryphed storage medium 99.

In some embodiments, the ipselecta-relicta selection data 933 is data that is interactively elicited and received from the end user (e.g., the purchaser of the final device). In some embodiments, the IRSD 933 specifies each soft asset in the panoplex and whether that respective asset is to be kept or culled. In other embodiments, the IRSD specifies only the soft assets in the relicta, wherein the non-specified assets are retained by default. In some embodiments, the IRSD specifies the particular order in which the relicta are to be uninstalled.

In some embodiments, IRSD 933 specifies which soft assets in the panoplex are to be kept, implicitly specifying that the relicta are all other soft assets on the panoplex. In some embodiments, the gryphing program 940 or a table that it uses specifies the particular order in which the relicta are to be uninstalled.

In some embodiments, IRSD 933 specifies to financial invoice/charging program 941 which soft assets in the panoplex are to be charged for, and financial invoice/charging program 941 charges for the selected content by either generating an invoice or deducting from an account (e.g., the account of the purchaser of this set of assets) an amount based, at least in part, on which soft assets are retained in the ipselecta 955. As used herein, "charging" includes any mechanism or facility to transfer, obtain, or ask for payment from a purchaser; "invoicing" includes any mechanism or facility to ask for payment or create a debt, such as, for example, creating an invoice that is mailed or electronically transmitted to a purchaser and that requests or demands future payment or otherwise debits a credit-card account; and "deducting" includes any mechanism or facility for transferring money at the present time from a purchaser's account to an account for the benefit of the seller.

In some embodiments, each intermediate workpiece 930 includes, as part of panoplex 911, sufficient gryph source data 932 (e.g., directory and registry data) to provide the information needed by gryphing program 940 to cull the undesired/unselected relicta portion of panoplex 911, under control of the IRSD 933. In some embodiments, each intermediate workpiece 930 includes the program code of gryphing program 940, such that alone or with the assistance of external operating-system code, the gryphing can be accomplished (either in the final device 960, or by a dedicated gryphing system).

FIG. 9B is a block diagram of another panoplex-generation and panoplex-gryphing process 904 for creating a storage medium 99 having a customized and/or user-selected set of soft assets 955. In some embodiments, process 904 includes a panoplex-generation process 905 and panoplex-gryphing process 906. As described above for process 901, in some embodiments, a plurality of soft assets 997 is installed into an installation storage medium (ISM) 910 using one or more installation programs 998. In some embodiments, panoplex 911 is then copied in two parts (panoplex' 926 (the panoplex less a certain amount of gryph data) and gryph data set 929) to a master storage medium (MSM) 923. In some embodiments, MSM 923 has one or more other panoplexes (e.g., panoplex' 924 and panoplex' 925) and corresponding gryph data sets (e.g., gryph data set 927 and gryph data set 928) stored thereon. By separating the gryphing data 929, the panoplex' 926 becomes more secure against theft of the soft assets therein. In some embodiments, an inventory of one or more intermediate workpieces 931 (which are each, e.g., a hardware/software combination) is created by copying the data for panoplex' 926 (e.g., the software portion) from MSM 923 to a corresponding number of blank end-user storage media 935 (the hardware portion, e.g., a disk drive or FLASH card). An individual one of the inventory of intermediate workpieces 931 is supplied, as needed, to panoplex-gryphing process 906. Separately, the gryph data set 929 is transmitted, transported, and/or supplied as gryph source data 932 that is input to gryphing program 940.

In some embodiments, panoplex-gryphing process 906 includes obtaining a set of gryph source data 932 from the gryph data set 929, obtaining ipselecta-relicta selection data (IRSD) 933 that indicates the selections of soft assets of a particular user, and gryphing the panoplex' 926 by using gryphing program 940 to achieve subtractive installation. The subtractive installation performed by gryphing program 940 culls the relicta (the soft assets that are to be removed), leaving erased space 958 in the place of the culled soft assets, and retaining the ipselecta 955 (the soft assets selected to be retained) to obtain a gryphed storage medium 99. In some embodiments, the set of ipselecta 955 include the ipselecta directory 952, the ipselecta registry 954, and the ipselecta asset data 956.

In some embodiments, each intermediate workpiece 931 omits from panoplex' 926, sufficient gryph source data 932 (e.g., directory and registry data) to make the soft assets of panoplex' 926 substantially useless unless rejoined with gryph source data 932 (obtained or received from a different source) and gryphed by gryphing program 940. In some embodiments, intermediate workpiece 931 is operatively coupled to end-user device 960 before the gryphing program executes. In some embodiments, once gryphing program 940 completes its operation, end-user device 960 is substantially or completely ready-to-use and functional for its end user. In some embodiments, each intermediate workpiece 931 includes the program code of gryphing program 940, such that alone or with the assistance of external operating-system code, the gryphing can be accomplished in and by the final device 960.

Figure 9C:
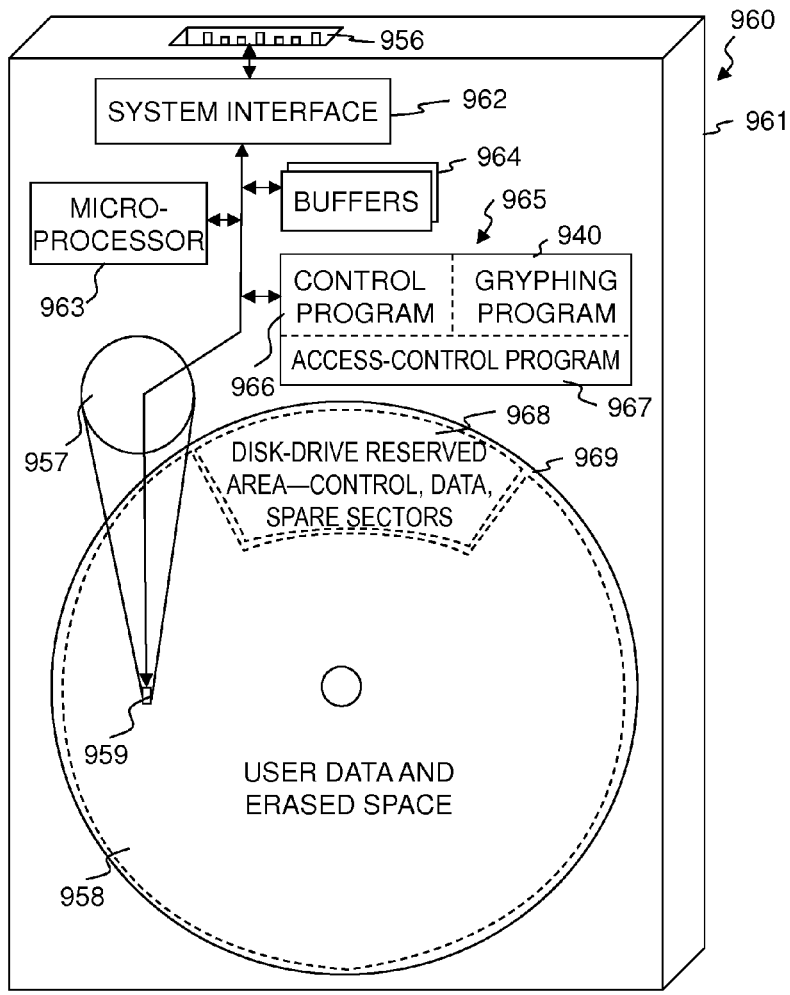
FIG. 9C is a block diagram of a storage device 960 (e.g., embodied on a disk drive 961) having a self-contained gryphing program 940.

FIG. 9C is a block diagram of a rotating-media storage device 960 (e.g., embodied on a disk drive 961) having a self-contained gryphing program 940. In some embodiments, most or all of process 902 (see FIG. 9A) is performed in the storage device 960. In some embodiments, disk drive 961 has one or more rotating disks 969 having data stored thereon, wherein the data is written and read by transducer 959 that is moved to selected data positions by actuator 957. In some embodiments, disk drive 961 also includes various electronics including microprocessor or controller 963, a data/instruction store 965, one or more buffers 964, and an external-device interface (also called a system interface) 962 used to accept data-transfer requests and to send data to and receive data from an external device such as the electronics of a personal computer 804 (see FIG. 8A) or percepter 805 (see FIG. 8B) through connector 956 (e.g., a serial ATA (SATA) connector). In some embodiments, the data on disk(s) 969 is divided into two or more subsets, including a user-data subset 958 and the disk drive's reserved-area subset 968. In some embodiments, when disk drive 961 is powered up, store 965 is loaded with control program 966 and access-control program 967. In some embodiments, control program 966 and access-control program 967 are used to control operation of disk drive 961, and to translate or map system addresses (e.g., logical-block addresses (LBAs) used by the external system to access disk-drive data) into disk-drive addresses (e.g., cylinder-head-sector (CHS) addresses used by controller 963 to access data on disk 969). That mapping process is also used to reassign spare sectors for those sectors that have failed or have unreadable or uncorrectable data, and to prevent user access to reserved area 968. In the embodiment of FIG. 9C, a panoplex 911 (see FIG. 9A) is initially stored on disk 969, but access to the data in the panoplex 911 by external devices is blocked by access-control program 967 until gryphing program 940 has been run to cull the unselected soft assets (relicta) and/or to charge the user for the retained assets (ipselecta 955). In some embodiments, control parameters, authorization codes and/or decryption keys are sent to gryphing program 940 through system interface 962 by an external device (such as an ordering, customization and/or selection computer), in order to enable gryphing program 940 to perform its gryphing operation, which, once completed, provides full access to the ipselecta 955. Access-control program 967 prevents reading the panoplex data before gryphing and the relicta data after gryphing. In some embodiments, if disk drive 961 is used (e.g., attempting to read data from the user-data area before gryphing is complete), the access-control program 967 will allow such normal use but will present zeros or some other data pattern instead of the panoplex data if any user-data sector is read before the system writes data to it. This allows the same disk drive 961 to be used as a gryph-able panoplex (if interfaced to a gryphing-program controller before first use) or as a normal blank drive (if accessed first by any other program), thus providing economies of scale and reducing inventory requirements to the system manufacturer.

Figure 9D:
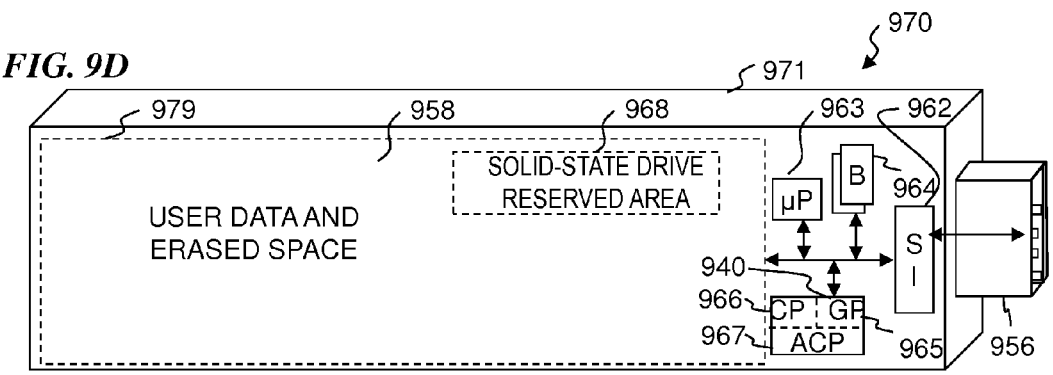
FIG. 9D is a block diagram of a storage device 970 (e.g., embodied on a solid-state drive 971) having a self-contained gryphing program 940.

FIG. 9D is a block diagram of a solid-state storage device 970 (e.g., embodied on a flash or other type of solid-state drive 971) having a self-contained gryphing program 940. In some embodiments, the operation of device 970 is substantially the same as described for device 960 of FIG. 9C, and most or all of process 902 (see FIG. 9A) is performed in the storage device 970. In some embodiments, solid-state drive 971 has one or more memory chips 979 having data stored thereon (e.g., using non-volatile memory such as FLASH, or memory that uses a thin-film battery embedded in device 970). In some embodiments, solid-state drive 971 also includes various electronics including microprocessor or controller 963, a data/instruction store 965, zero or more buffers 964, and a system interface 962 used to accept data-transfer requests and to send and receive data from an external device such as the electronics of a personal computer 804 (see FIG. 8A) or percepter 805 (see FIG. 8B) through connector 956 (e.g., a USB connector). In some embodiments, the data on chip(s) 979 is divided into two or more subsets, including a user-data subset 958 and a reserved-area subset 968. In some embodiments, when solid-state drive 971 is powered up, store 965 is loaded with control program (CP) 966 and access-control program (ACP) 967. In some embodiments, control program 966 and access-control program 967 are used to control operation of solid-state drive 971, and to translate or map system addresses (e.g., logical-block addresses (LBAs) used by the external system to access disk-drive data), into chip-sector addresses used by controller 963 to access data on chip(s) 979). That mapping process is also used to reassign spare sectors for those sectors that have failed or have unreadable or uncorrectable data, and to prevent user access to the reserved area 968. In the embodiment of FIG. 9D, a panoplex 911 (see FIG. 9A) is initially stored on chip(s) 979, but access to the data in the panoplex 911 by external devices is blocked by access-control program 967 until gryphing program 940 has been run to cull the unselected soft assets (relicta) and/or to charge the user for the retained assets (ipselecta 955). In some embodiments, control parameters, authorization codes and/or decryption keys are sent to gryphing program 940 through system interface 962 by an external device (such as an ordering, customization and/or selection computer), in order to enable gryphing program 940 to perform its gryphing operation, which, once completed, provides full access to the ipselecta 955. Access-control program 967 prevents reading the panoplex data before gryphing and the relicta data after gryphing.

Figure 9E:
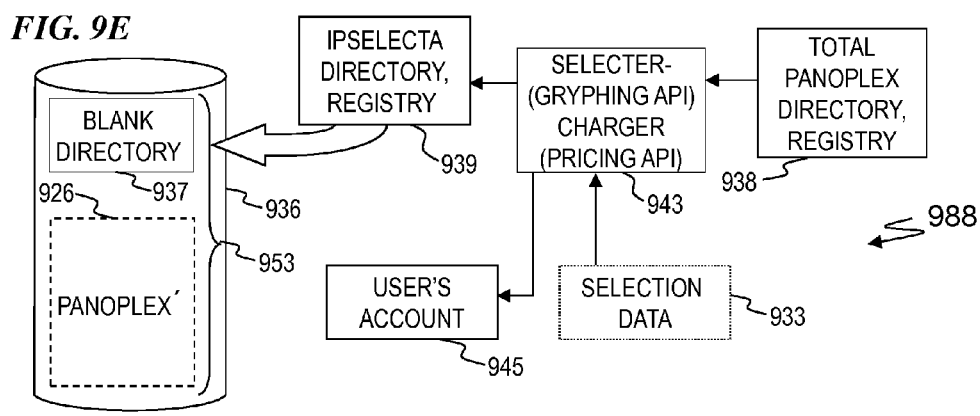
FIG. 9E is a block diagram of a process 988 to process a blankoplex 953 used for a storage device 936.

FIG. 9E is a block diagram of a process 988 to process a blankoplex 953 stored on a storage device 936. In at least some of the embodiments described above, the process of gryphing reads at least some program(s) (such as the gryphing program itself) and/or data (such as file directory data, registry data, manifest data and the like) in order to perform the gryphing process. In contrast, in some embodiments such as shown in FIG. 9E, no data need be read from storage medium 936. Rather, a directory structure 937 (and/or registry data, partition data, manifest data) is provided at the location(s) expected by the operating system, wherein this initial directory 937 is blank or substantially blank (i.e., indicating that all or substantially all of the storage space (other than the directory itself) is available for storage of user data. If used as is, without gryphing process 943, blankoplex 936 acts as a normal blank storage medium (e.g., a blank disk drive or blank solid-state drive). If, instead, gryphing process 943 operates and writes directory data and/or registry data and/or the like, then storage medium 936 will end up with ready-to-use ipselecta. In some embodiments, a process, such as process 904 of FIG. 9B, separates a panoplex 911 into certain gryph data 929 and the remaining panoplex' 926. In some embodiments, the separated gryph data 929 is the total panoplex directory and registry (TPDR) data 938 (which, in some embodiments, also contains other data) shown in FIG. 9E, and is input to selector-charger process 943, along with ipselecta-relicta selection data (IRSD) 933 obtained from choices made by a user or purchaser. In some embodiments, selector-charger process 943 includes a gryphing API (application programming interface) that operates on TPDR data 938 to generate the gryphed ipselecta directory-registry 939 (containing only data relevant to the ipselecta, and indicating all other storage space is available for storing of other data) and a pricing-charging API that presents pricing options to the user and elicits and receives selection data based on the choices and prices selected by the user. In some embodiments, selector-charger process 943 debits an amount (based on the selections made and ipselecta kept) from the user's account 945 (either directly or by invoice sent to the user). In some embodiments, selector-charger process 943 causes the ipselecta directory-registry 939 to be written on top of the blank directory area 937 to convert blankoplex 953 into a ready-to-use storage medium 99 (see FIG. 9B) having the customized and/or user-selected set 955 of soft assets and erased space 958. In some embodiments, storage medium 99 is connected to the device that will use its soft assets after the gryphing process 943 operates, while in other embodiments, blankoplex 936 is connected to the device first, and gryphing process 943 operates afterward. In some embodiments, the individual files and assets of panoplex' 926 are broken into pieces and stored in a scattered manner, in order to make reconstruction and/or use of the assets more difficult unless provided with the gryphed ipselecta directory-registry 939.

While these techniques have been illustrated with several specific, currently widely-used file systems, they are of general application to any file system that manages physical storage. The above description is illustrative only and is not limiting. Instead, the present invention is defined solely by the claims which follow and their full range of equivalents.

It is to be understood that the above description is intended to be illustrative, and not restrictive. Moreover, it is not necessary for a device or method to address each and every problem sought to be solved by the present invention, for it to be encompassed by the present claims. Furthermore, no element, component, or method step in the present invention is intended to be dedicated to the public regardless of whether the element, component, or method step is explicitly recited in the claims. No claim element herein is to be construed under the provisions of 35 U.S.C. §112 paragraph 6 unless the element is expressly recited using the phrase "means for" or, in the case of a method claim, the element is expressly recited as a "step" instead of an "act."

Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A computer-implemented method for modifying a first storage medium having a plurality of files stored therein, wherein the plurality of files are stored on the first storage medium according to a file system, the method comprising:
   rendering at least a portion of the plurality of files unavailable for use through data structures on the first storage medium maintained by the file system unless and until a modification operation is performed;
   obtaining a first set of metadata describing each file of the plurality of files, wherein the first set of metadata includes directory information that identifies locations on the first storage medium at which the plurality of files are stored; and
   automatically modifying a first subset of the first set of metadata such that the modified directory information metadata corresponds to a first subset of the unavailable files and such that each file contained within the first subset of the unavailable files is made available for use.

2. The method of claim 1, further comprising overwriting a first data block of at least a first file of the unavailable files not contained within the first subset, and overwriting one or more data blocks of the at least first file that are subsequent to the first data block.

3. The method of claim 1, further comprising encrypting at least a portion of the plurality of files.

4. The method of claim 1, wherein the obtaining of the first set of metadata describing each file of the plurality of files includes obtaining the first set of metadata from the first storage medium.

5. The method of claim 1, wherein the obtaining of the first set of metadata includes obtaining the first set of metadata from a location not on the first storage medium, and wherein the automatically modifying of the first subset of the first set of metadata includes writing the modified directory information metadata into storage locations used by an operating system for access to the first subset of the unavailable files.

6. The method of claim 1, further comprising:
   after the automatically modifying of the first subset of the first set of metadata, operatively coupling the first storage medium to an end-user information-processing device for a first time.

7. The method of claim 1, further comprising automatically modifying the first storage medium such that, in place of at least a first file of the unavailable files not contained within the first subset, data space becomes available for storage of other files.

8. The method of claim 1, wherein the automatically modifying of the first subset of the first set of metadata includes:
   constructing a list containing the first subset of the unavailable files and storing the list in a hash table;
   scanning the first set of metadata; and
   copying, based on the list stored in the hash table, the first subset of the first set of metadata into a second set of metadata.

9. A non-transitory computer-readable medium having instructions stored thereon for causing a suitably programmed computer to execute a method for modifying a first storage medium having a plurality of files stored therein, wherein the plurality of files are stored on the first storage medium according to a file system, the method comprising:
   rendering at least a portion of the plurality of files unavailable for use through data structures on the first storage medium maintained by the file system unless and until a modification operation is performed;
   obtaining a first set of metadata describing each file of the plurality of files, wherein the first set of metadata includes directory information that identifies locations on the first storage medium at which the plurality of files are stored; and
   automatically modifying a first subset of the first set of metadata such that the modified directory information metadata corresponds to a first subset of the unavailable files and such that each file contained within the first subset of the unavailable files is made available for use.

10. The computer-readable medium of claim 9, further comprising instructions such that the method further comprises overwriting a first data block of at least a first file of the unavailable files not contained within the first subset, and overwriting one or more data blocks of the at least first file that are subsequent to the first data block.

11. The computer-readable medium of claim 9, further comprising instructions such that the method further comprises encrypting at least a portion of the plurality of files.

12. The computer-readable medium of claim 9, further comprising instructions such that the obtaining of the first set of metadata describing each file of the plurality of files includes obtaining the first set of metadata from the first storage medium.

13. The computer-readable medium of claim 9, further comprising instructions such that the obtaining of the first set of metadata includes obtaining the first set of metadata from a location not on the first storage medium, and such that the automatically modifying of the first subset of the first set of metadata includes writing the modified directory information metadata into storage locations used by an operating system for access to the first subset of the unavailable files.

14. The computer-readable medium of claim 9, further comprising instructions such that the method further comprises, after the automatically modifying of the first subset of the first set of metadata, operatively coupling the first storage medium to an end-user information-processing device for a first time.

15. The computer-readable medium of claim 9, further comprising instructions such that the method further comprises automatically modifying the first storage medium such that, in place of at least a first file of the unavailable files not contained within the first subset, data space becomes available for storage of other files.

16. The computer-readable medium of claim 9, further comprising instructions such that the automatically modifying of the first subset of the first set of metadata includes:
constructing a list containing the first subset of the unavailable files and storing the list in a hash table;
scanning the first set of metadata; and
copying, based on the list stored in the hash table, the first subset of the first set of metadata into a second set of metadata.

17. An apparatus comprising:
a processor;
a first storage medium that has a plurality of files stored therein, wherein the plurality of files are stored on the first storage medium according to a file system;
a protection module that executes in the processor and that is operatively coupled to the first storage medium, wherein the protection module is operable to render at least a portion of the plurality of files unavailable for use through data structures on the first storage medium maintained by the file system unless and until a modification operation is performed;
a first set of metadata that describes each file of the plurality of files, wherein the first set of metadata includes directory information that identifies locations on the first storage medium at which the plurality of files are stored; and
a grypher that executes in the processor and that is operatively coupled to the first storage medium, wherein the grypher is operable to automatically modify a first subset of the first set of metadata such that the modified directory information metadata corresponds to a first subset of the unavailable files and such that each file contained within the first subset of the unavailable files is made available for use.

18. The apparatus of claim 17, wherein the grypher is further configured to overwrite a first data block of at least a first file of the unavailable files not contained within the first subset, and to overwrite one or more data blocks of the at least first file that are subsequent to the first data block.

19. The apparatus of claim 17, wherein the first set of metadata is located on the first storage medium.

20. The apparatus of claim 17, further comprising an end-user information-processing device, wherein the first storage medium is operatively coupled to the end-user information-processing device for a first time after the grypher automatically modifies the first subset of the first set of metadata.

* * * * *